United States Patent [19]

Mitchell

[11] Patent Number: 5,651,053
[45] Date of Patent: Jul. 22, 1997

[54] TELEPHONE CALL SCREENING

[76] Inventor: Peter P. Mitchell, c/o The Ergo Research Group, Inc. Human Factors/Marketing Research 83 East Ave., Suite 208, Norwalk, Conn. 06851-4902

[21] Appl. No.: 378,962

[22] Filed: Jan. 26, 1995

[51] Int. Cl.⁶ .............................. H04M 1/64; H04M 1/66
[52] U.S. Cl. .............................. 379/67; 379/142; 379/196; 379/199; 379/207
[58] Field of Search ............................ 379/67, 88, 89, 379/196, 197, 199, 210, 213, 201, 207, 142, 373, 375, 215, 249

[56] References Cited

U.S. PATENT DOCUMENTS

| | | | |
|---|---|---|---|
| 4,899,358 | 2/1990 | Blakley | 379/67 |
| 5,029,196 | 7/1991 | Morganstein | 379/211 |
| 5,117,451 | 5/1992 | Ladd et al. | 379/67 |
| 5,155,760 | 10/1992 | Johnson et al. | 379/67 |
| 5,208,848 | 5/1993 | Pula | 379/67 |
| 5,222,120 | 6/1993 | McLeod et al. | 379/88 |
| 5,222,125 | 6/1993 | Creswell et al. | 379/67 |
| 5,276,731 | 1/1994 | Arbel et al. | 379/88 |
| 5,309,512 | 5/1994 | Blackmon et al. | 379/210 |
| 5,327,486 | 7/1994 | Wolff et al. | 379/96 |
| 5,329,578 | 7/1994 | Brennan et al. | 379/67 |
| 5,347,574 | 9/1994 | Morganstein | 379/210 |
| 5,361,295 | 11/1994 | Solomon et al. | 379/67 |
| 5,375,161 | 12/1994 | Fuller et al. | 379/57 |
| 5,434,906 | 7/1995 | Robinson et al. | 379/67 |
| 5,511,111 | 4/1996 | Serbetcioglu et al. | 379/67 |

FOREIGN PATENT DOCUMENTS 5-30193  2/1993  Japan ................................ 379/249

OTHER PUBLICATIONS

"Calling Party Delivery," Bell Communications Research, TR-NWT-000031, Dec. 1992.
AT&T Technical Journal, Nov./Dec. 1994, vol. 73, No. 6, pp. 39–47.
"Personal Communication Services and the Intelligent Network," A. Batten, *British Telecommunications Engineering*, vol. 9, Aug. 1990, pp. 88–91.

*Primary Examiner*—Thomas W. Brown
*Attorney, Agent, or Firm*—Donald S. Dowden

[57] ABSTRACT

A Call Screening service assists a subscriber to the service to screen incoming calls. In response to an incoming call, the subscriber is given a special ring. When the subscriber answers the call, a caller who has placed the call is identified to the subscriber without connecting the subscriber to the caller. This is accomplished by prompting the caller to speak through the phone into a recording machine. The recording of the caller's name is played to the subscriber, who then has the option, still without being connected to the caller, to accept the call, refuse the call, or enable the caller to leave a recorded message for later access by the subscriber. This function is accomplished by pressing a key on a telephone keypad or by uttering a command. A special caller list can be created enabling preferred callers to reach the subscriber without being screened, and a refusal list can be generated for automatically blocking calls from disfavored callers. A new and effective way of terminating calls in mid-conversation is also provided.

1 Claim, 32 Drawing Sheets

To deactivate a subscriber

To reactivate a subscriber

TELEPHONE CALL SCREENING

BACKGROUND OF THE INVENTION

1. Field of the Invention

The present invention relates in general to telecommunications systems and methods for screening and answering calls, and in particular to a novel system and method of processing the call.

2. Description of the Prior Art

Many people are overwhelmed by their telecommunications services at home and at work. In many homes and businesses, the phone has become as much an intrusion as a convenience. People are often confronted with phone calls at inconvenient times. There is an unmet demand for a telecommunications service that lets the consumer politely refuse unwanted calls.

AT&T Technical Journal of November/December 1994, volume 73, No. 6, pages 39–47, discloses network-based services provided on service processing systems that interoperate with, but are separate from, the network switches. The use of these systems has lead to the implementation of Intelligent Networks (IN). Service processing systems support the creation, modification, and scripting capabilities needed to provide the services. The paper defines service processing systems; describes how market forces require their functionality; discusses IN, voice recognition, and service creation technologies; describes new services being provided through these technologies; and lists some AT&T intelligent network products and services.

OBJECTS AND SUMMARY OF THE INVENTION

An object of the invention is to provide a remedy for the problems of the prior art outlined above.

In accordance with the invention, the foregoing and other objects are attained in a telephone system providing a service assisting a subscriber to the service to disengage politely from a call that the subscriber has already accepted.

Some Basic and Optional Features

The subscriber can turn the service On and Off as desired.

There is a refusal list associated with a subscriber's service that blocks calls to the subscriber's phone from a phone having a number stored on the refusal list. In this instance the calling party receives a standard message indicating that the call is refused.

When the called party presses a key or utters a command to refuse the call, the called party hears a message indicating that the call has been refused, and is then given the opportunity, by pressing a key or giving a command, to automatically store the phone number of the refused call on the refusal list.

The subscriber to the service can customize the refusal message that the calling party hears when the calling party's call is refused.

The service always retains the phone number of the last call either received or placed by or from the subscriber's phone, to the extent that that information is made available to the CS by the telephone network. Using administrative functions that are a part of the service, the subscriber can automatically place the number of the last call (whether placed or received) on either the special caller list or the refusal list.

The subscriber can access the refusal list and hear the list, delete a number from the list, add a number to the list, or exit from that function.

A subscriber who is on a call with some calling party can, by pressing the switch hook, politely get out of the call and not have to speak further with the calling party. When the subscriber presses the switch hook, the calling party is given a message indicating that the subscriber does not wish to continue the conversation and the caller is instructed to hang up. After pressing the switch hook, the subscriber receives a confirmation message that the Polite Refusal feature has been activated, and then, as with the refusal function with an incoming call, the subscriber is given the option of putting the phone number of this caller on the subscriber's Refusal List.

The service is compatible with Call Waiting and Ring Master services, which are offerings of the local Bell operating companies.

BRIEF DESCRIPTION OF THE DRAWING

A better understanding of the objects, features, and advantages to the invention can be gained from a consideration of the following detailed description of the preferred embodiments thereof, in conjunction with the appended figures of the drawing, wherein.

DESCRIPTION OF THE PREFERRED EMBODIMENTS

When a calling party dials the phone number of a subscriber to the service, the call passes through the calling party's central office (CO) switch, into the network and to the subscriber's CO switch. That switch determines if the subscriber's phone number has associated with it any special handling requirements or special services. A signal is then sent through the Switching Transfer Point (STP) and into the Service Control Point (SCP) database, which determines the special handling requirements (including, in this case, that the call should be passed to the Call Screening Intelligent Peripheral (CSIP)). This intelligent peripheral processor then calls the subscriber's CO switch and passes through the required instructions for handling the call from the calling party. This call link between the CSIP 40 and the subscriber's CO switch may be continually maintained; or, once the appropriate instructions have been passed from the CSIP 40 to the subscriber's CO switch, the call link may be terminated, in which case the subscriber's CO switch handles the call from the calling party.

Figure 1:
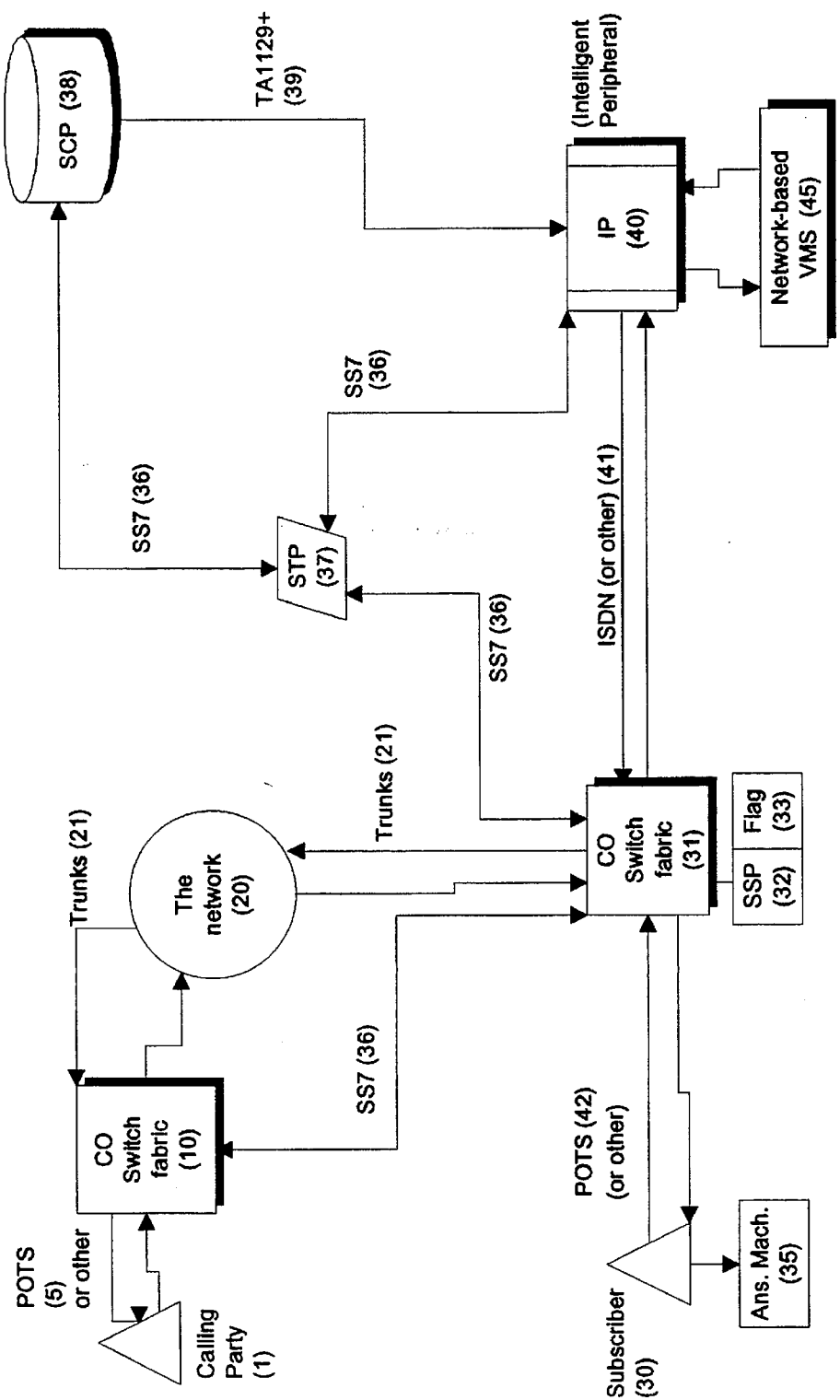
FIG. 1 is a schematic black diagram of the network architecture and the operational platform for a polite refusal service provided in accordance with the invention.

FIG. 1 describes the main components of the telephone network affected by the hardware and software associated with the implementation of this invention. The following are definitions of these telephone system components. The SSP 32, or the Signal Switching Point, includes the software that makes the Central Office switch smart enough to know that a specific subscriber has a special service or a set of services. The CSIP 40, or Call Screening Intelligent Peripheral, includes the hardware and software application assisting in the delivery of the services provided by this invention. The SS7 36 or Signaling System 7 is the signaling protocol that all nodes in the AIN (Advanced Intelligent Network) use to pass information related to a telephone call with special services attached. The POTS 5, 42 is Plain Old Telephone Service, the type of service used by most residential customers and some businesses. The STP 37, or Switching Transfer Point, is a node on the SS7 network that has knowledge of where all intelligent nodes are located in the network and what information is available from each SCP. The SCP 38, or Service Control Point, is a very large database in the SS7/AIN architecture. ISDN PRI/BRI 41, Primary Rate or Basic Rate ISDN lines, transmit information packets relating to the calls coming in and going out.

Overall Network: FIG. 1

Key components of the service shown in FIG. 1 include the calling party's phone 1, the calling party's central office switch 10, the overall telephone network 20, the subscriber's phone 30, the subscriber's central office switch 31, the signal transfer point (STP) 37, the SCP database 38, and the Call Screening Intelligent Peripheral (CSIP) 40, which may be a fault-tolerant processor, a PC, a mini-computer, a server, or some other type of processor. There are special connecting links between these main components and there are other sub-components that are described below.

Detailed Description of Telephone Network Architecture

The following description is based upon the system elements shown in FIG. 1. The calling party dials the subscriber's phone number on the calling party's phone 1. The call is carried over a POTS (Plain Old Telephone Service) line 5, or some other appropriate telephone line (such as an ISDN, T-1, or other line-side interface) from the calling party's phone to the calling party's central office (CO) switch 10. The call is then passed out into the telephone company's network 20 over standard trunk lines 21, and the call is received at the subscriber's CO switch 31. The Signal Switching Point (SSP) 32 associated with the subscriber's CO switch 31 determines if this subscriber's phone number has associated with it any special handling requirements or special services. If it has, a flag indicator 33 is presented. This causes a signal (out-of-band signaling) to be sent using Signaling System 7 (SS7) protocol 36 to one or more Signal Transfer Points (STP) 37. The signal continues following SS7 (out-of-band signaling) protocol from the STP to the Service Control Point or Signal Control Point (SCP) 38.

From the customer (subscriber) information stored in the SCP 38, the SCP 38 determines that this call should be handled by the Call Screening Intelligent Peripheral (CSIP) 40 and sends a signal to the CSIP via TA1129+ protocol 39. The CSIP 40 then places a call to the subscriber's CO switch 31 over a line such as an Integrated Services Digital Network (ISDN) line 41, or some other appropriate line connection.

At this point the connection between the CSIP 40 and the subscriber's CO switch 31 is maintained continuously throughout the interaction between the calling party and the subscriber. In this case the CSIP 40 continues to control the call and the interactions between the two parties.

Administrative Functions

With the Call Screening service, the subscriber can access a set of administrative functions to do the following:

(a) Turn the service On and Off;

(b) Take the number of the last call that was either received or placed and put it on the Refusal List;

(c) Hear the list, Delete a number from the list, or Add a new number to the list;

(d) Change the Refusal Message that all rejected callers will hear.

FIGS. 2 to 32 illustrate the administration functions for the service and should be consulted in conjunction with the following description.

On the flow charts and in the description below, the specific key presses described and the wording of the prompts are given for example only. Other key presses and other wording can be specified and the service will still operate as required.

Main Administrative Menu

To start the process, the subscriber goes off-hook at step 1 (FIG. 2): i.e. picks up the phone. The CO switch 31 (FIG. 1) supplies dial tone to the subscriber at step 2. The subscriber begins to dial at step 3, and as the CO switch 31 collects the digits it queries the SCP 38 at step 4 over the SS7 connection 36, 37. The SCP 38 sends a signal back to the CO 31 at step 5 telling it to collect digits with a timeout. The switch collects the digits then queries the SCP what to do next at step 6.

If the digits collected are numeric digits, the CO switch 31 handles the transaction as an ordinary telephone call and places it, following customary telephone company protocol.

If the digit collected is the "pound" key (#), the SCP 38 sends a signal to the CO switch 31 over the SS7 line 36, 37 at step 10 telling it to send the subscriber's ID (phone number) over the ISDN (or other) line 41 to the Call Screening IP 40. The CO switch 31 then transfers the call and the information to the CSIP 40 at step 11.

The CSIP 40 sets the counter to "1" at step 12. If it is determined at step 14 that the service is currently turned Off, the CSIP 40 will play a message at step 16 advising that it can be turned On by pressing "1". The CSIP 40 then checks at step 17 to see if last call was received or placed. If received, the CSIP 40 plays a message at step 18 (FIG. 3) indicating that the last number received can be stored by pressing "2"; if placed, the CSIP 40 plays another message at step 19 indicating that the last number placed can be stored by pressing "2".

The CSIP 40 then plays another message at step 23 indicating that the Refusal List that is stored in the processor can be accessed by pressing "4".

If the service is currently turned On, the CSIP 40 plays a message at step 25 advising that it can be turned Off by pressing "8". It then advises at step 26 that these instructions can be heard again by pressing "9" and that work on the administrative functions can be exited by pressing the star key or by hanging up.

At step 27, CSIP 40 then collects the digit that the subscriber has input, with a timeout. At step 28, the CSIP 40 checks to see if the digit is acceptable, and if it is not, the counter is incremented by "1" at step 30. The CSIP 40 then checks at step 32 to see if the count is equal to "3", and if not, plays an invalid response message at step 34 and starts the process over, returning the user to step 14 described above. If the count is equal to "3", the CSIP 40 plays a "try later" message at step 37 (FIG. 4), then disconnects the subscriber at step 38 and tells the CO switch 31 to play a fast-busy signal at step 39 until the user goes on-hook.

Turning the Service On

Figure 5:
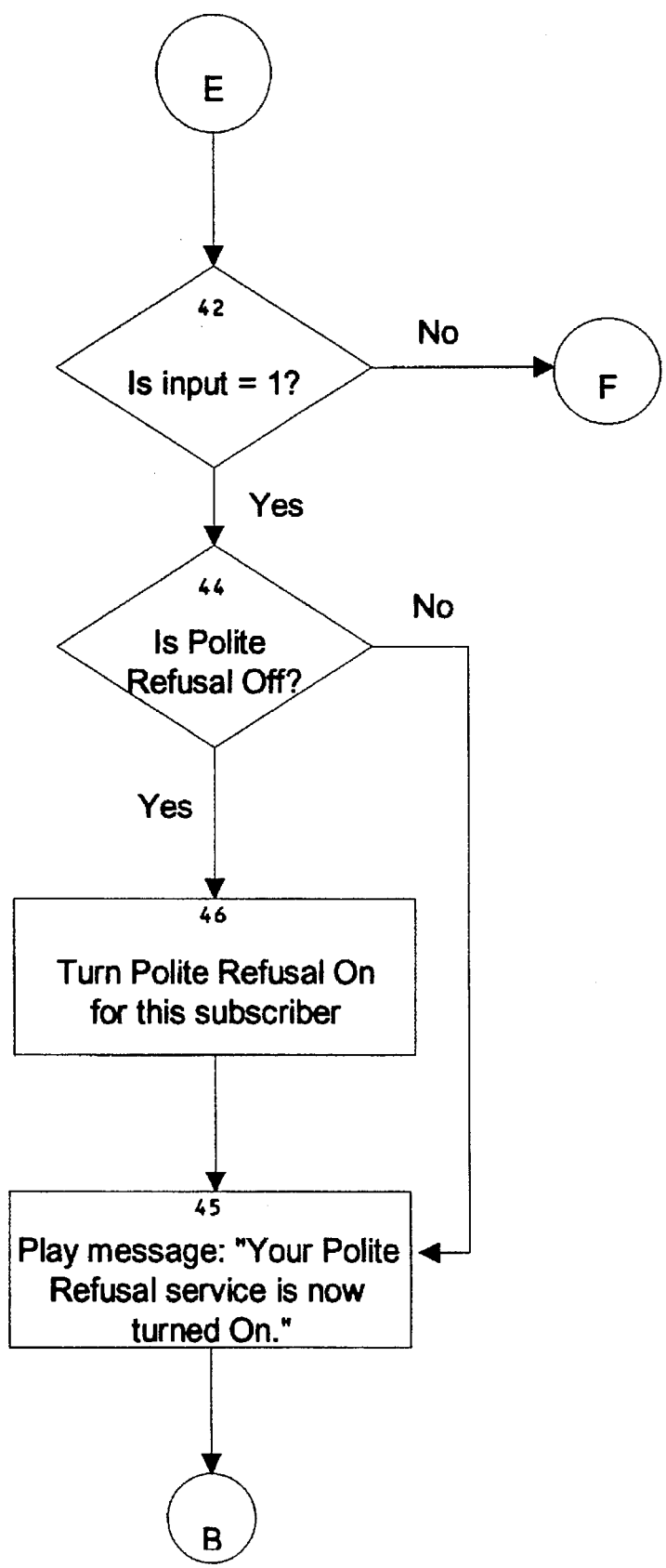
Figure 6:
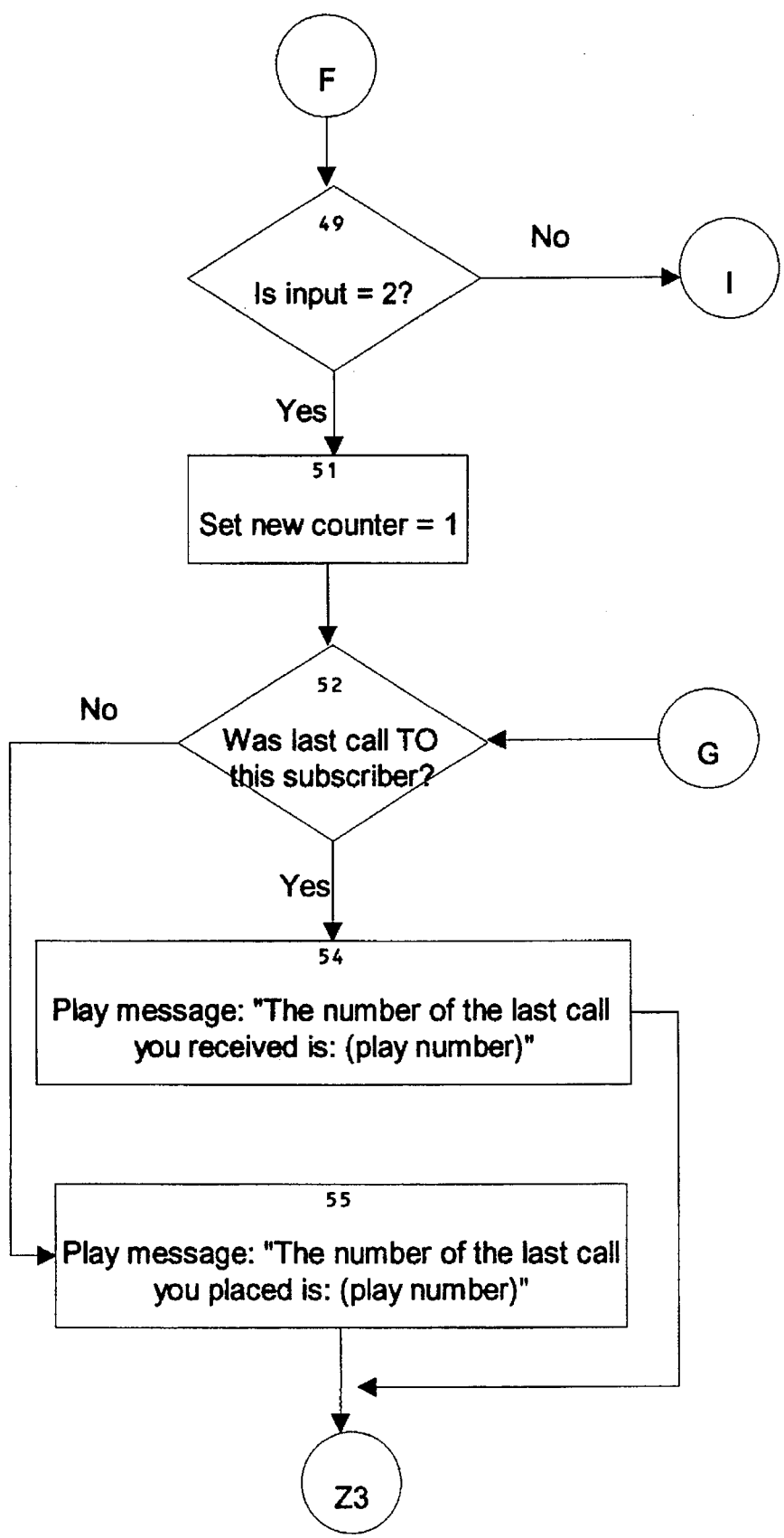
Figure 7:
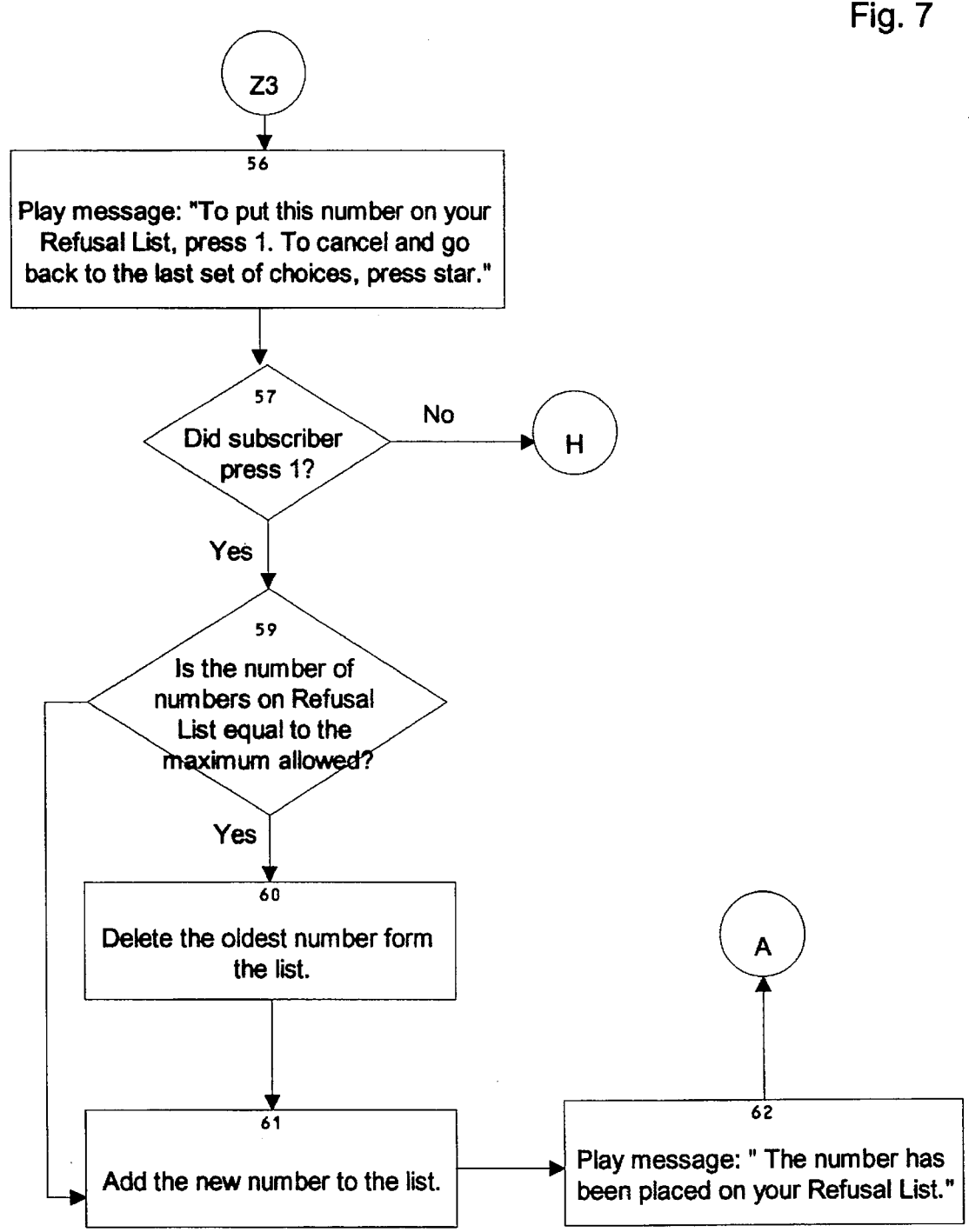

The service is turned On by selecting option "1" from the main administrative menu (Step 42 in FIG. 5). This choice is presented only if the service is currently Off; choice "8", to turn the service Off is not presented if the service is currently Off.

Figure 2:
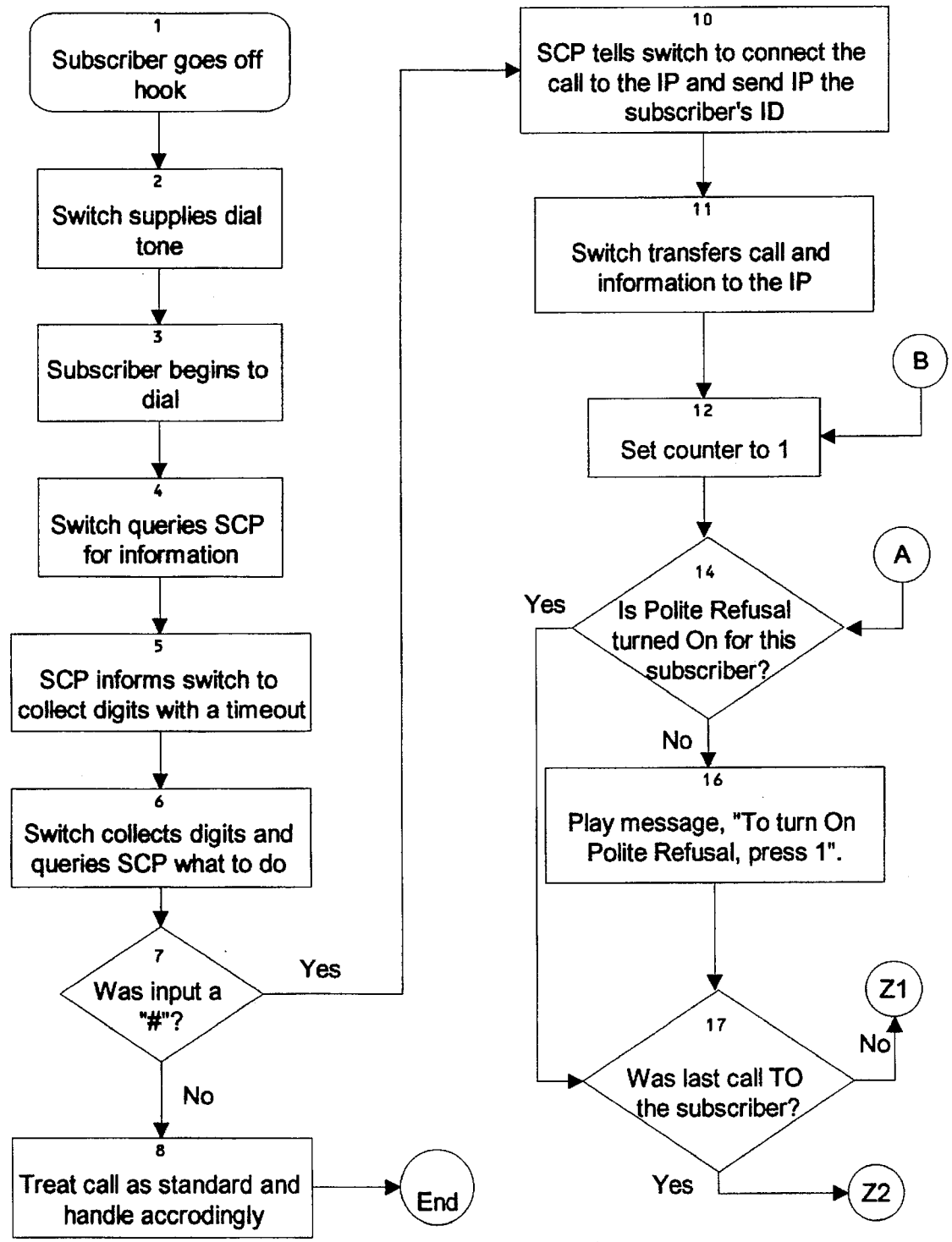
FIGS. 2 to 32 illustrate the software flow of the administrative functions associated with the invention and the call flow of the Polite Refusal operations.

When the service is Off and the subscriber enters a digit from the main menu, the CSIP 40 collects the digit. If the digit collected at step 27 is found to be acceptable at step 28, the CSIP 40 checks at step 42 to see if input="1" (an instruction to turn the service On). If the service is determined at step 44 to be currently Off, the CSIP 40 turns the service On at step 46 and at step 45 plays a feedback message indicating that the service is now turned On. Then the CSIP 40 returns to step 12 of the main administrative menu (FIG. 2).

If the service is already turned On and the subscriber selects "1" (even though this is not given as an option in the prompt), the system gives the message at step 45 and then goes to step 12, as described above.

Store Last Number

If the digit collected at step 27 (FIG. 3) is acceptable as determined at step 28 and not-"1" as determined at step 42 (FIG. 5), the CSIP 40 checks at step 49 (FIG. 6) to see if the input="2", which is an instruction to store the number of the last call either received or placed. If the input="2", the CSIP 40 sets the count in a second counter to "1" at step 51 and then checks at step 52 to determine whether the last call was received or placed. If received, the CSIP 40 plays a "last call received" message at step 54; if placed, the CSIP 40 plays a "last call placed" message at step 55. The CSIP 40 then plays an instructional prompt at step 56 (FIG. 7) giving the subscriber the option to put the number on the Refusal List. The subscriber also has the option at step 56 of pressing the star key to cancel this operation and go back to the main administrative menu. The CSIP 40 then checks at step 59 to see if the list currently contains the maximum allowable number of entries and if so, it drops the oldest entry from the list at step 60 and then adds the new entry at step 61. If it is determined at step 62 that the list is not full, it just adds the new entry at step 68. The CSIP 40 then plays feedback to the subscriber at step 69 indicating that the last number has been put on the list.

Figure 8:
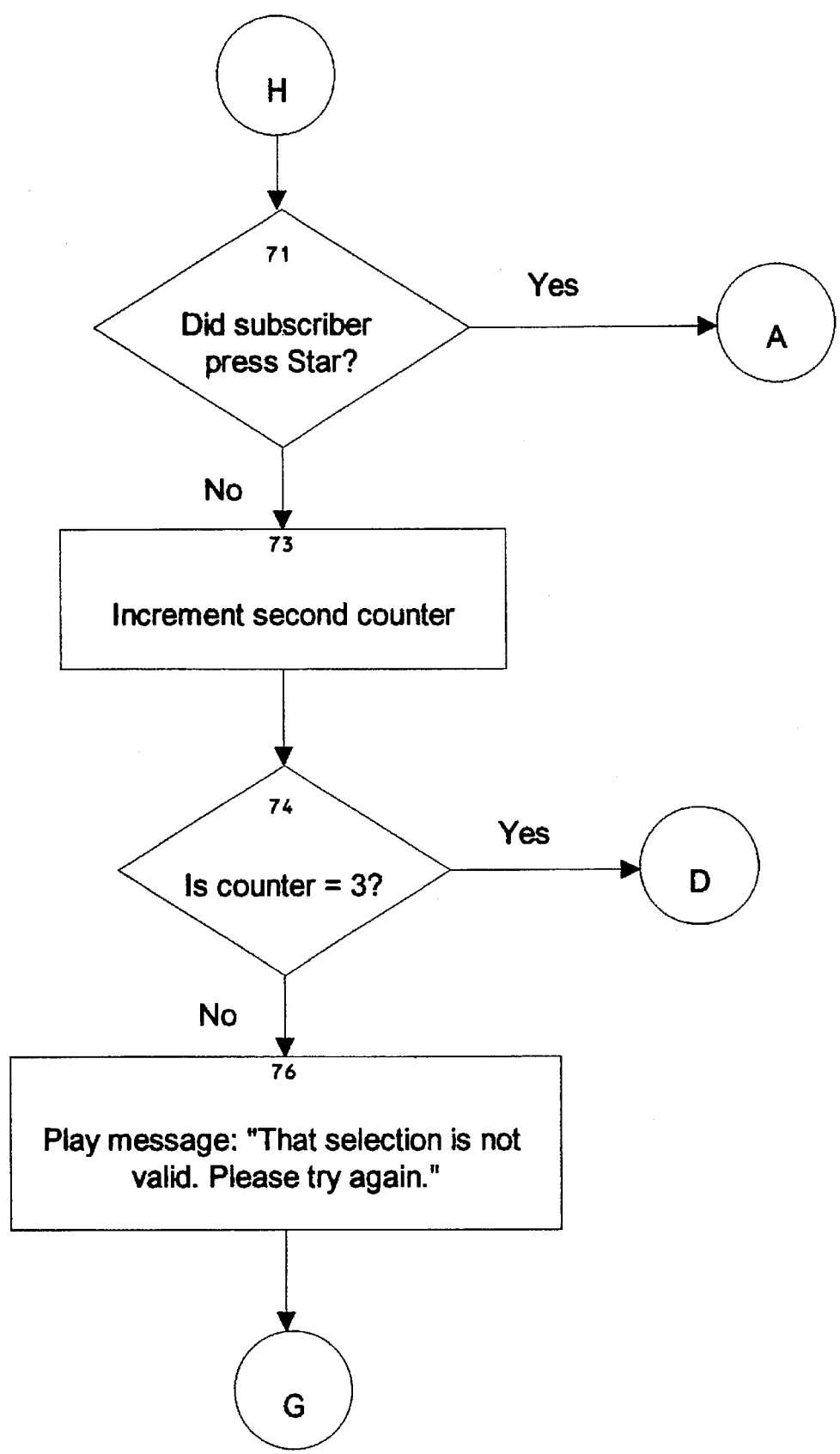
Figure 9:
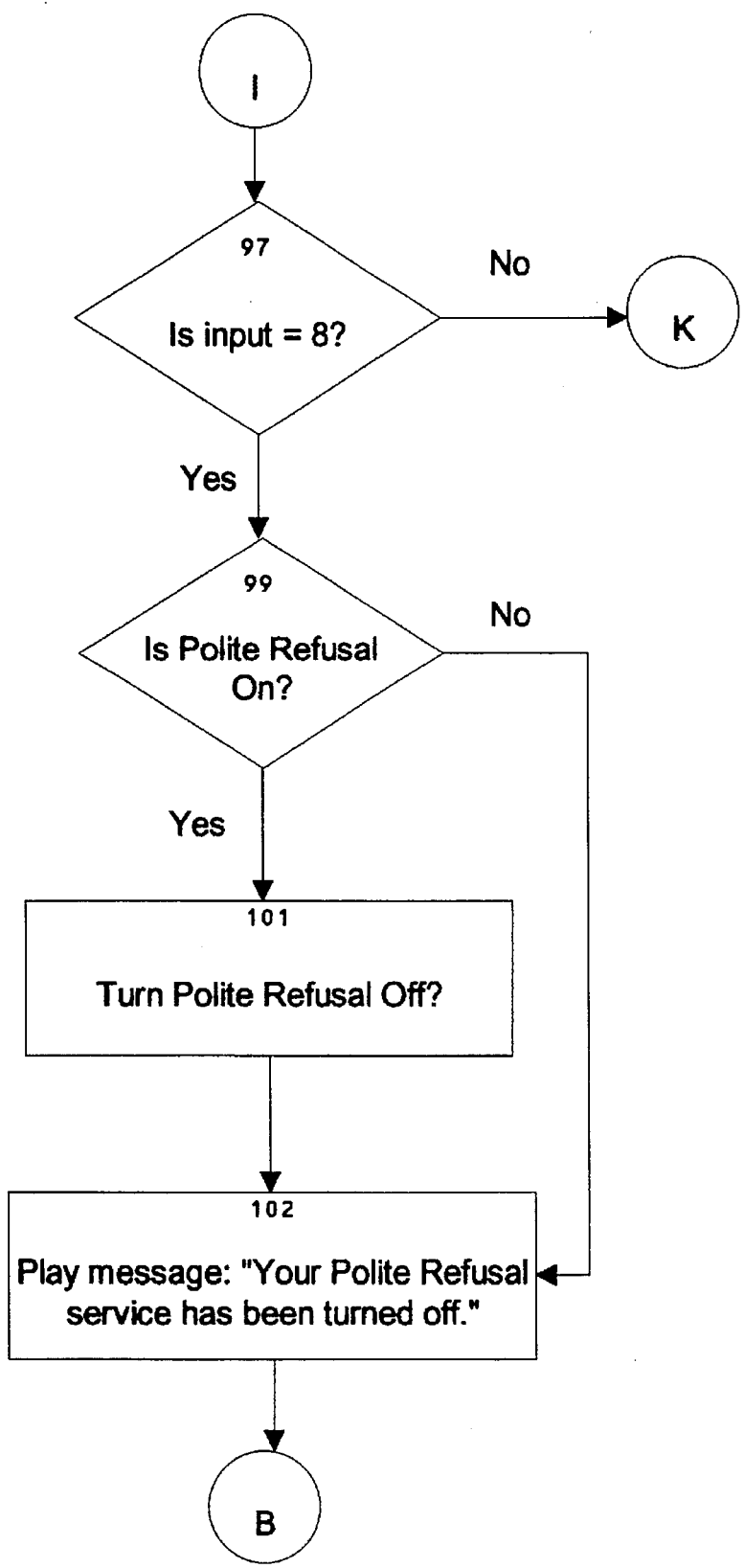
Figure 10:
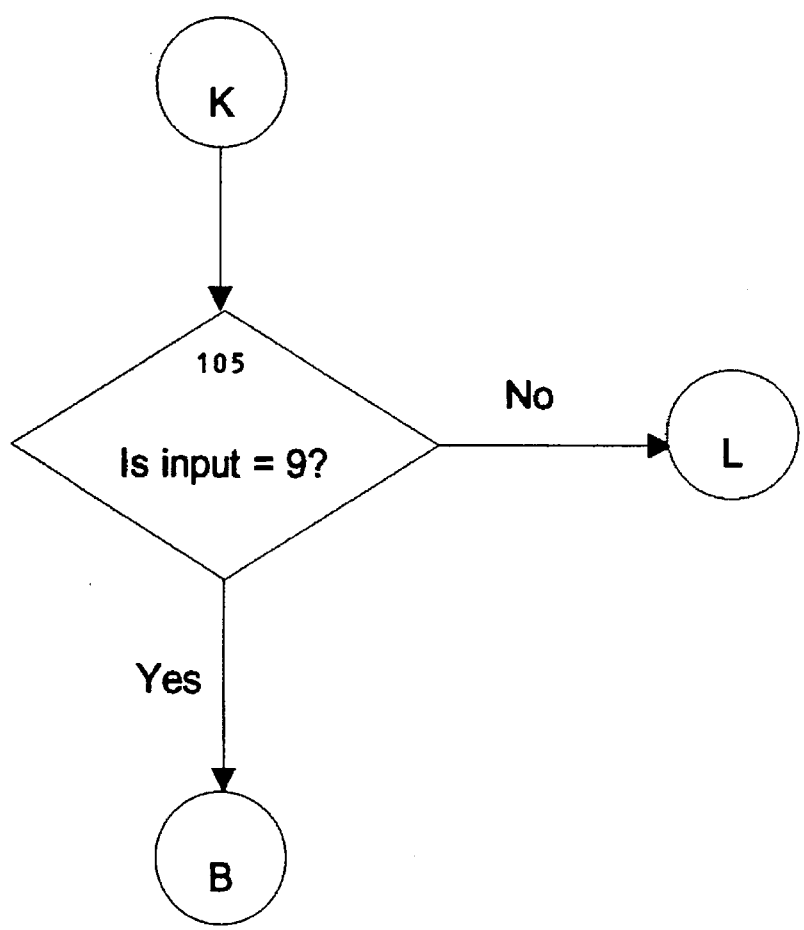
Figure 11:
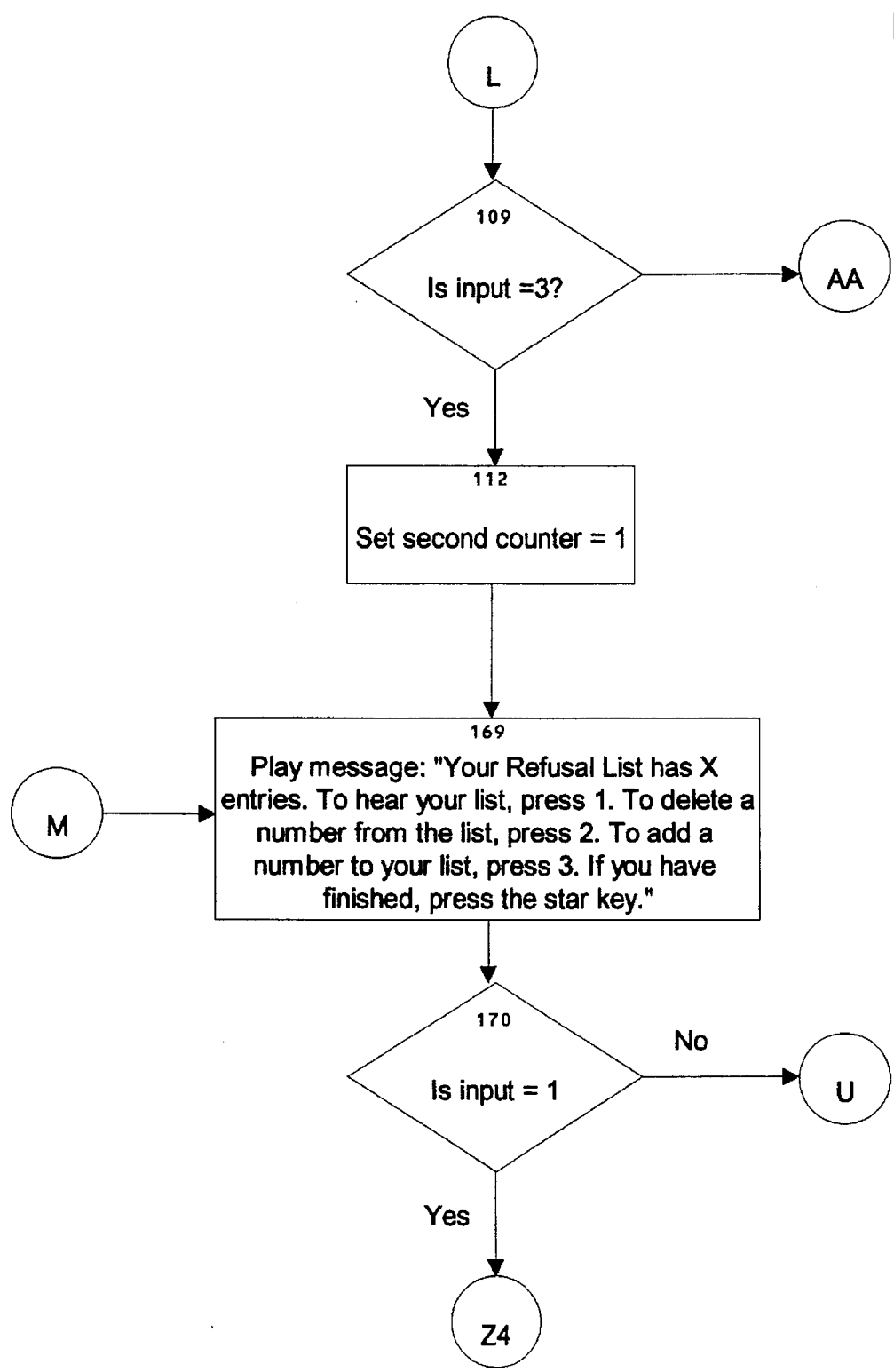

If it is determined at step 57 (FIG. 7) that the subscriber has not pressed either "1" or "2", the CSIP 40 checks at step 71 (FIG. 8) to see if he has pressed the star key to return to the administrative menu, and if so, returns to the first prompt (step 14 in FIG. 2) in that menu. If the star key is not pressed, the CSIP 40 increments the second counter by "1" at step 73 (FIG. 8). It then determines at step 74 if the counter is equal to "3", and if so, it goes to the error message at step 37 (FIG. 4) and terminates the call. If the count in the second counter is not equal to "3", the CSIP 40 plays an instructional message at step 76 and lets the subscriber try the task again beginning at step 52 in FIG. 6.

Turning The Service Off

Figure 3:
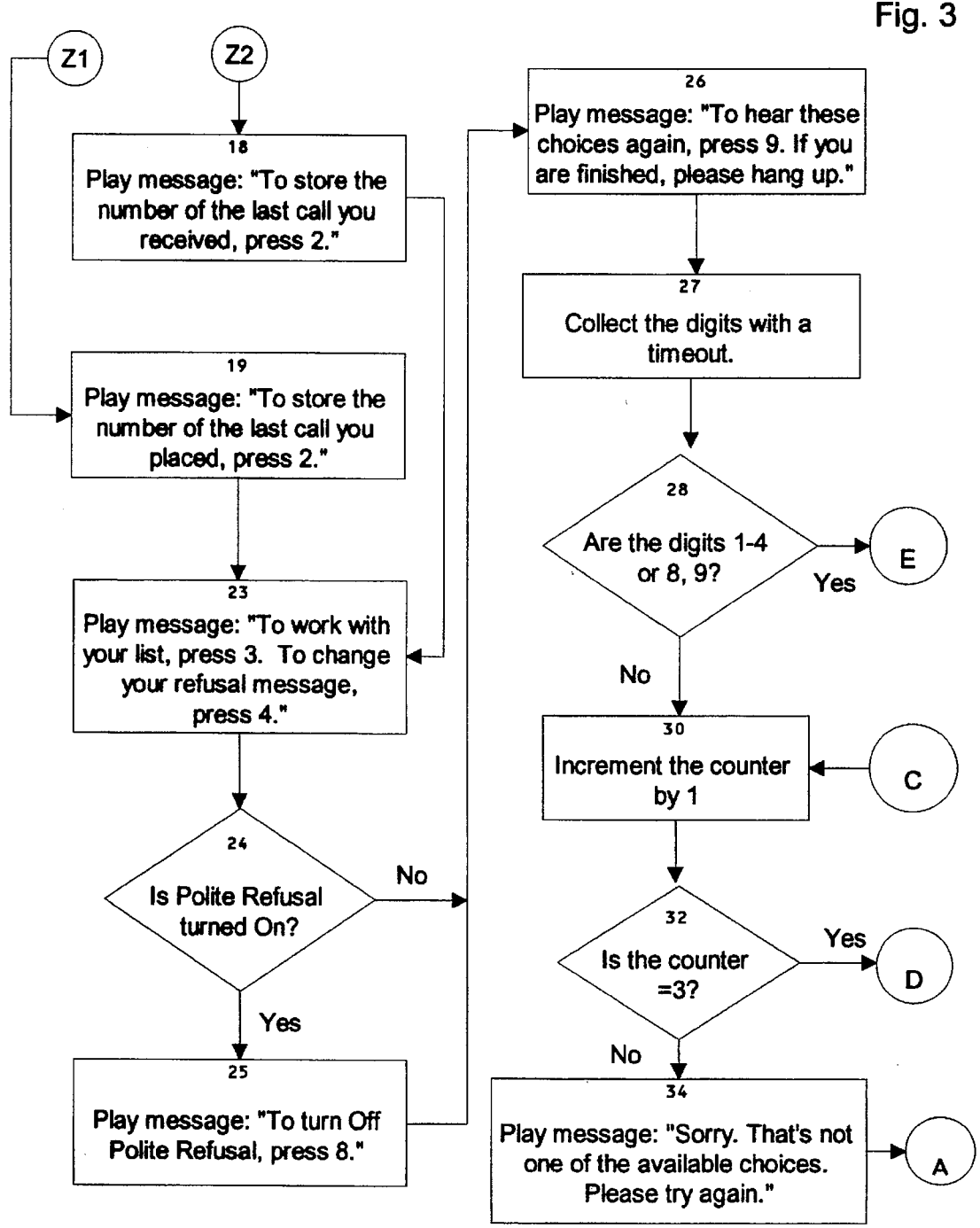
Figure 4:
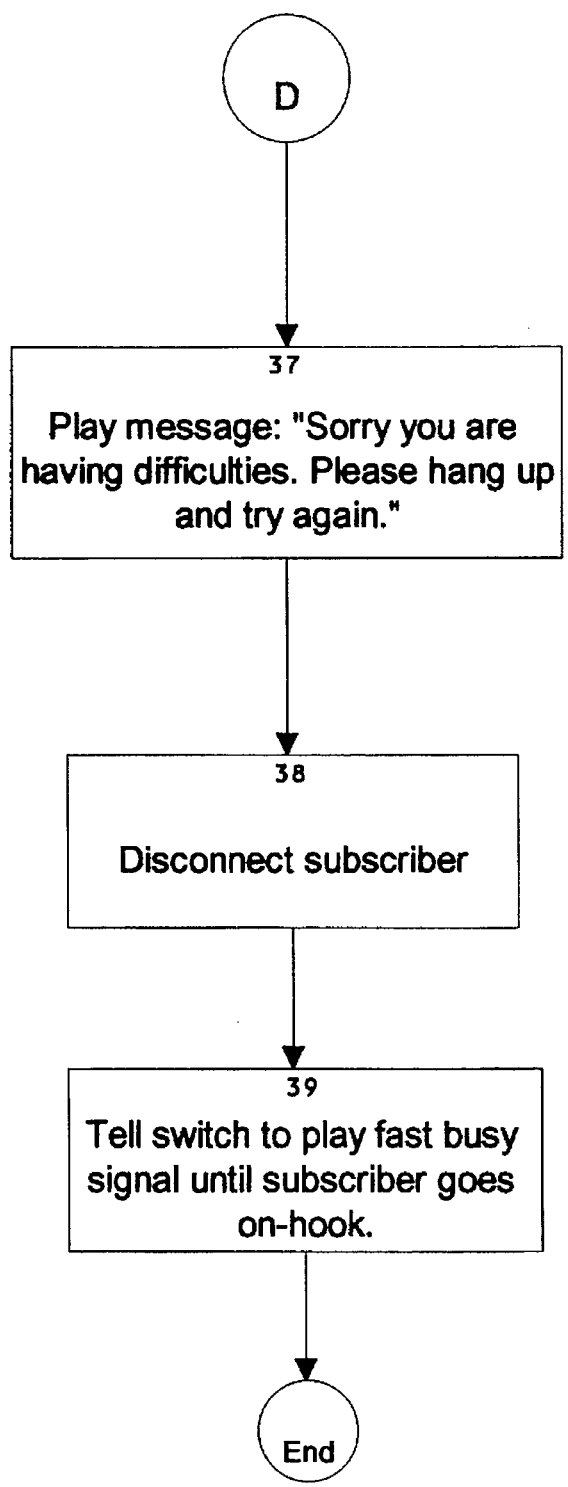

The service is turned Off by selecting option "8" from the main administrative menu (FIG. 3). This choice is presented only if the service is currently On; choice "1", to turn the service On, is not presented if the service is currently On.

When the service is On and the subscriber enters a digit from the main menu, the CSIP 40 collects the digit at step 27. If the digit collected at step 27 is determined at step 28 to be acceptable, the CSIP 40 checks for each digit in turn as described above and if the checks are all negative it ultimately checks at step 97 (FIG. 9) to see if the input="8", which is an instruction to turn the Call Screening service Off. If input="8", the CSIP 40 checks at step 99 to see if the service is currently On. If it is currently On, the CSIP 40 turns it Off at step 101 and then plays a confirming message at step 102 and returns to step 12 (FIG. 2).

If service is currently Off and the subscriber selects "8" (even though this is not given as an option in the prompt), the system gives the message at step 102 and then goes to step 12 as described above.

Working with The List

If the digit collected in at step 27 is found acceptable at step 28 (FIG. 2), the CSIP 40 checks sequentially as described above and if it keeps getting negative answers ultimately checks at step 109 (FIG. 11) to see if the input= "4", working with the list. It also indicates at step 169 that if finished, the subscriber can press the star key to return to the main administrative menu.

Refusal List

If the user wishes to hear the Refusal List, the CSIP 40 plays a message at step 169 (FIG. 11) telling the user how many numbers are on the list, to press "1" to hear the list and advising him to press "2" to delete a number from the list, to press "3" to add a number to the list, or if finished, to press the star key to return to the main administrative menu.

Figure 12:
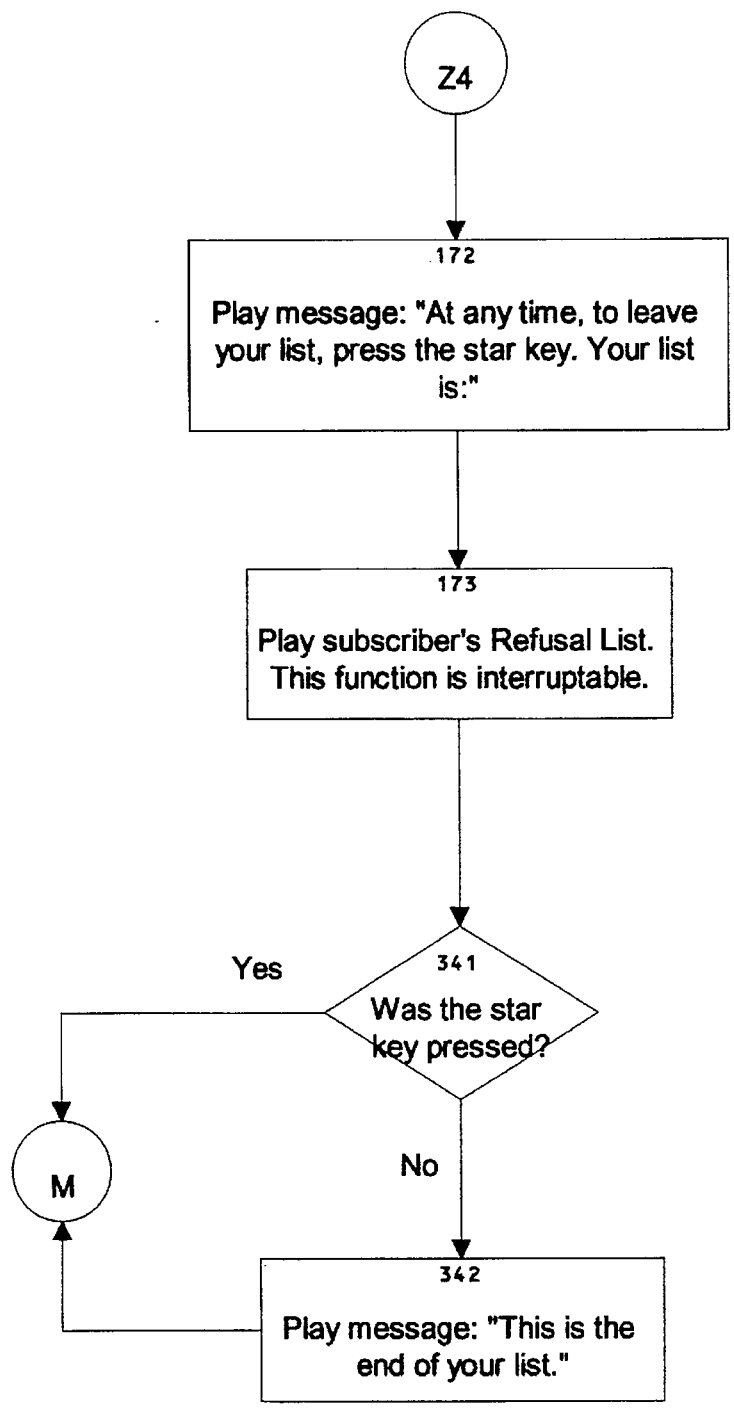
Figure 13:
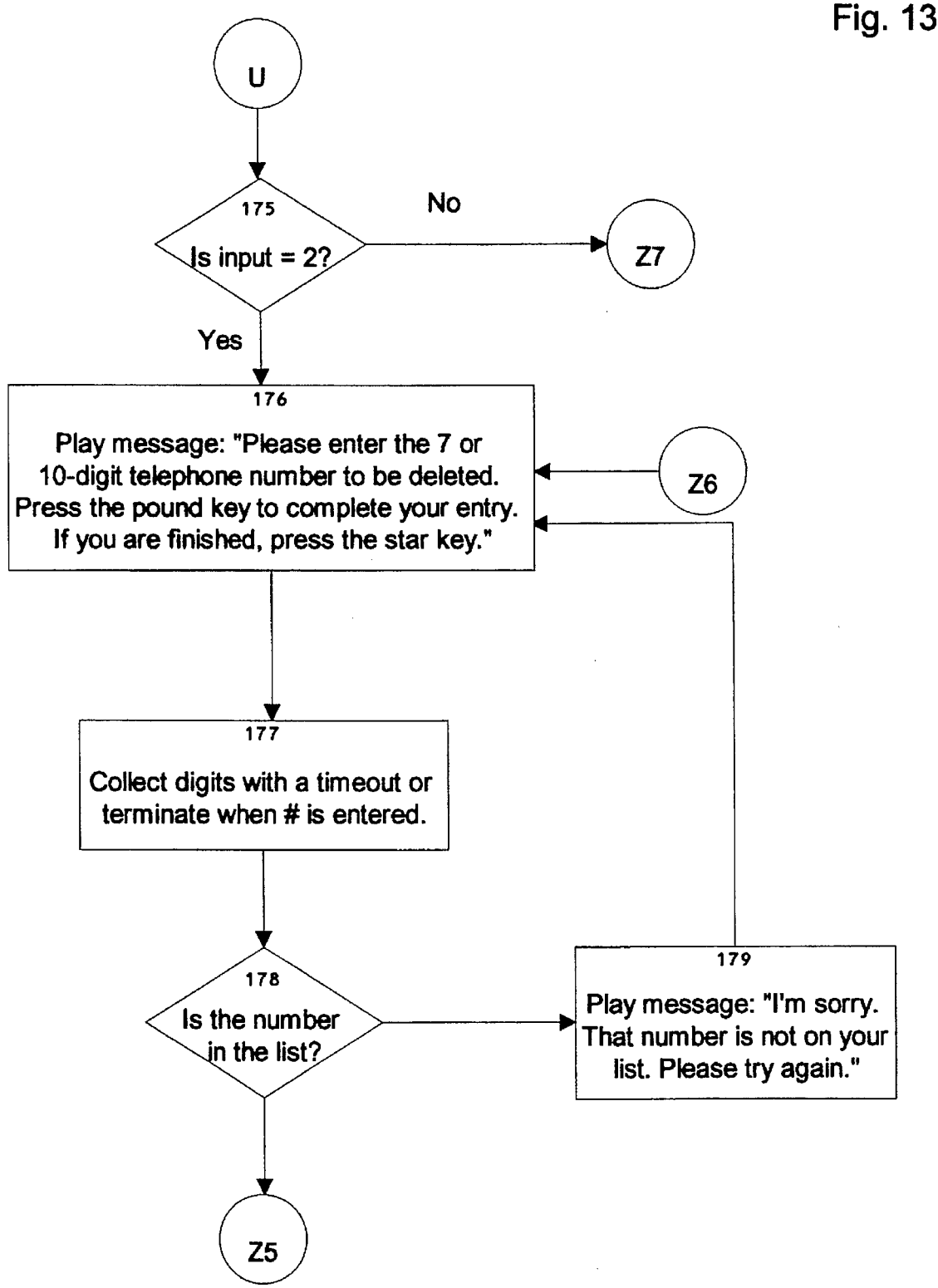
Figure 14:
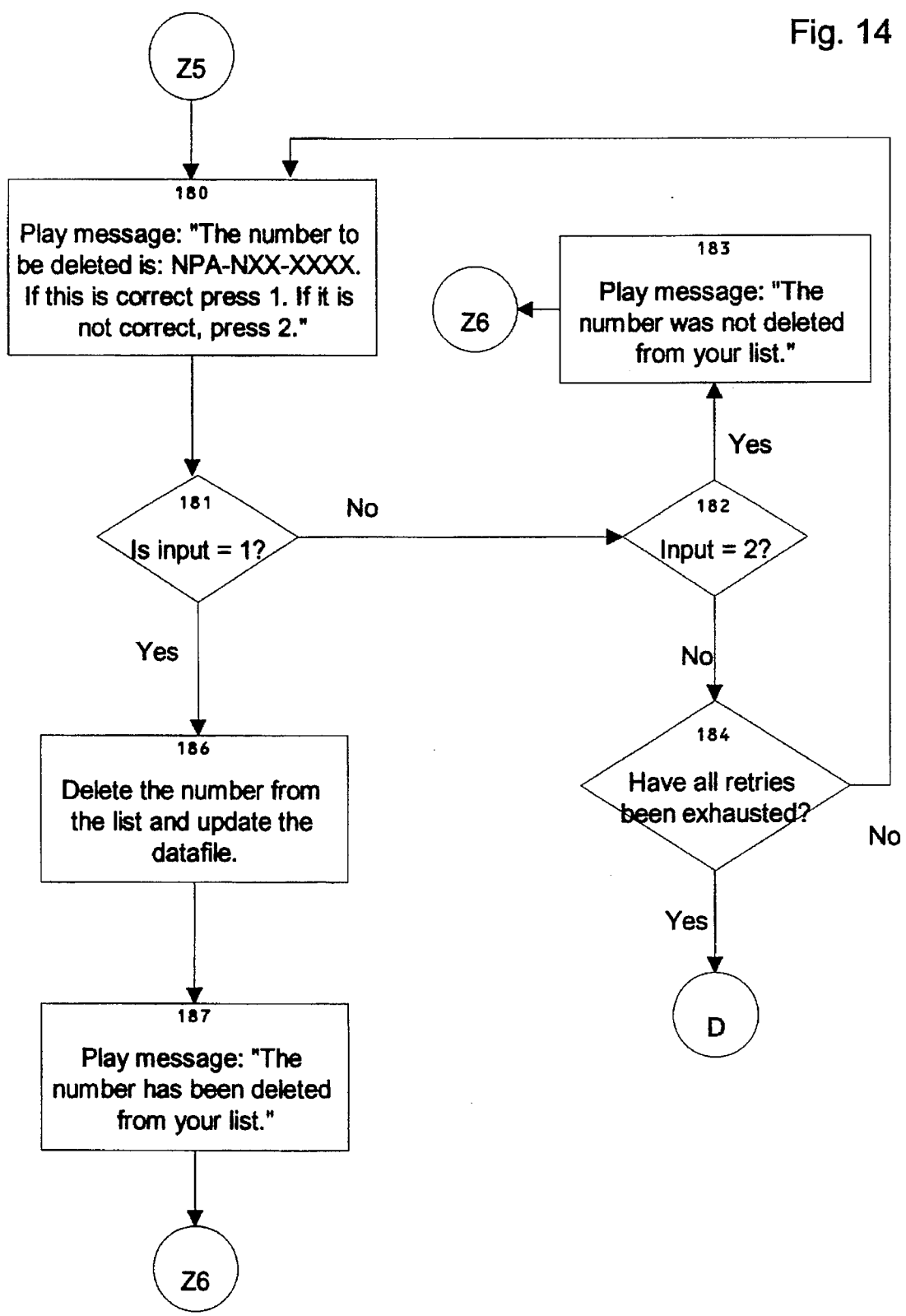

If it is determined at step 170 (FIG. 11) that the input at step 169="1", the CSIP 40 plays a message at step 172 (FIG. 12) telling the subscriber that he can stop the list reading at any time by pressing the star key, and then provides a prompt for the beginning of the list. The CSIP 40 then reads the numbers on the list at step 173 (FIG. 12).

If the input at step 169 is determined at step 170 (FIG. 11) to be "2", the CSIP 40 plays a message at step 176 (FIG. 13) instructing the subscriber to enter the telephone number to be deleted, and to press the pound key to complete the entry. It also indicates that if finished, the subscriber can press the star key to return to the main administrative menu.

At step 177 (FIG. 13), the CSIP 40 collects the digits with a timeout or terminates when the pound key is entered. At step 178, the CSIP 40 then checks this number to see if it matches an entry in the list. If it does not match an entry, the CSIP 40 plays a "try again" message at step 179, and then returns to step 176 to allow another attempt. If it does match an entry in the list, the CSIP 40 reads the entry at step 180 (FIG. 14) and the choice is given to press "1" if correct, or press "2" if not correct. The CSIP 40 collects the digit, and if it is determined at step 181 that the input="1", the CSIP 40 deletes the number and updates the file at step 186 and then plays a confirming message at step 187. The CSIP 40 then goes back to step 176 and repeats the process.

If it is determined at steps 181, 182 that the input at step 180="2", the CSIP 40 does not delete the number; it plays a "not deleted" message at step 183 and then goes to step 176. If it is determined at steps 181, 182 that the number entered at step 180 is other than "1" or "2", the CSIP 40 plays an error message at step 185 and returns to step 180 to allow the user to try again. If it is determined at step 184 that all retries have been exhausted, the CSIP 40 plays the error message at step 37 (FIG. 4) and terminates.

Figure 15:
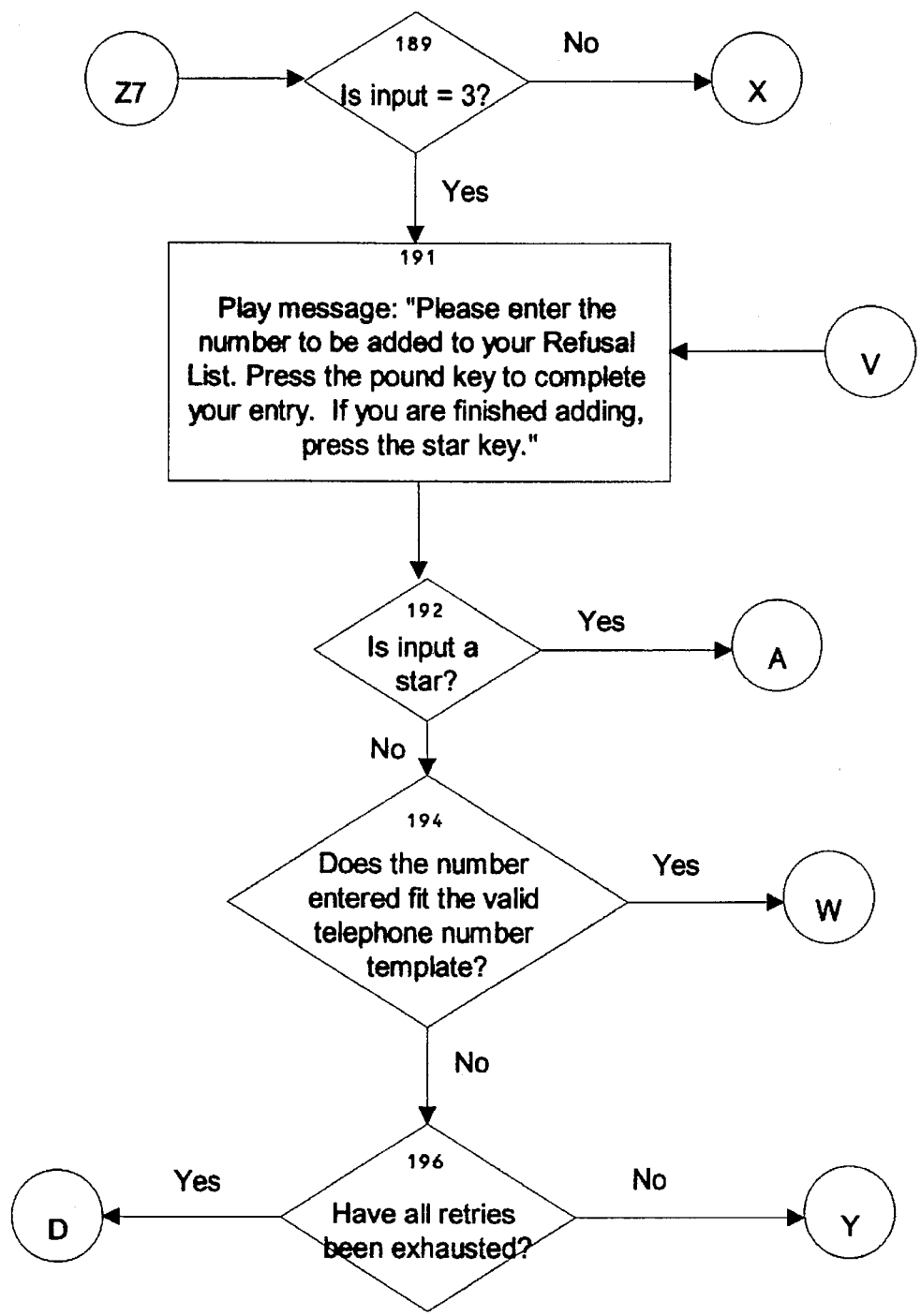
Figure 16:
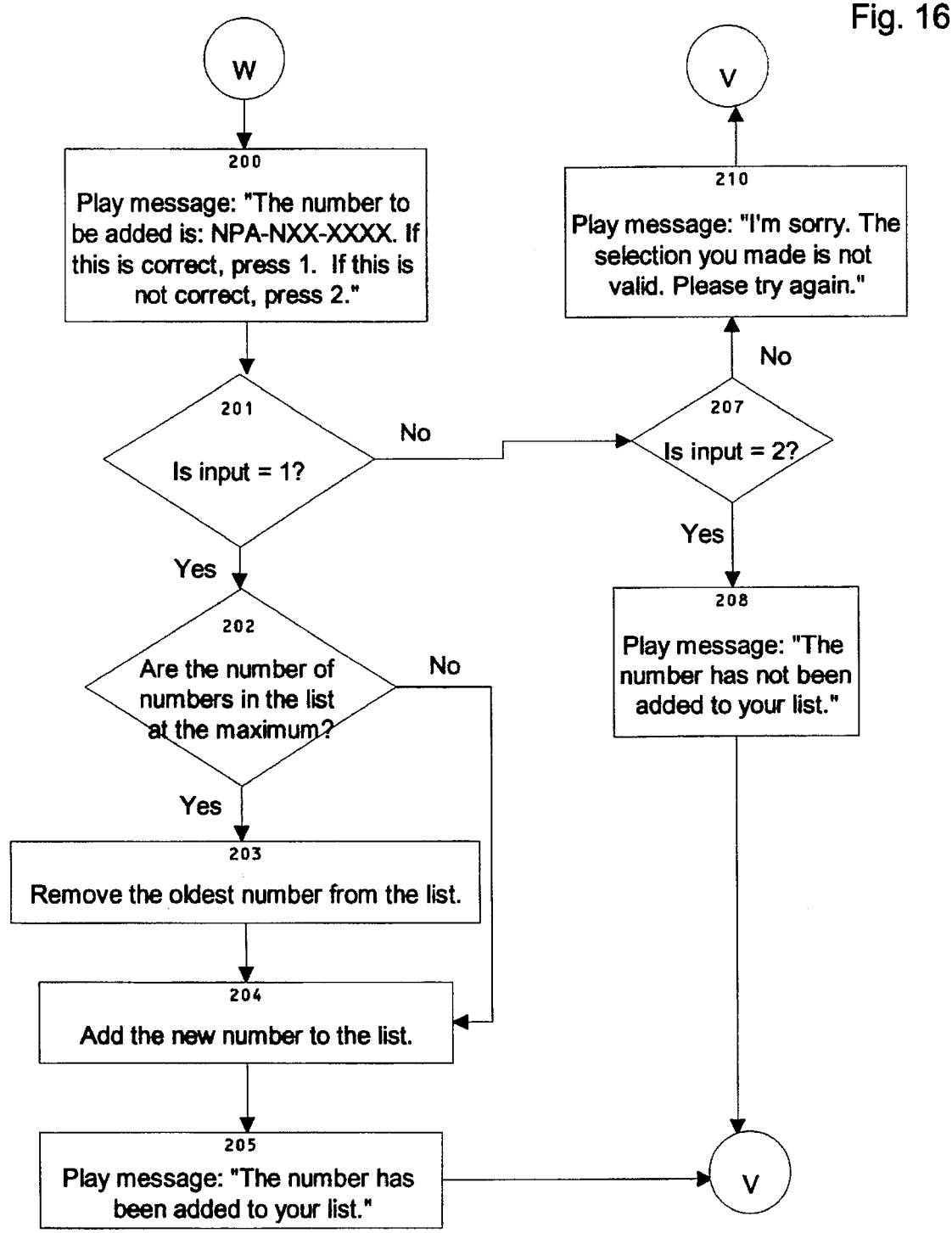
Figure 17:
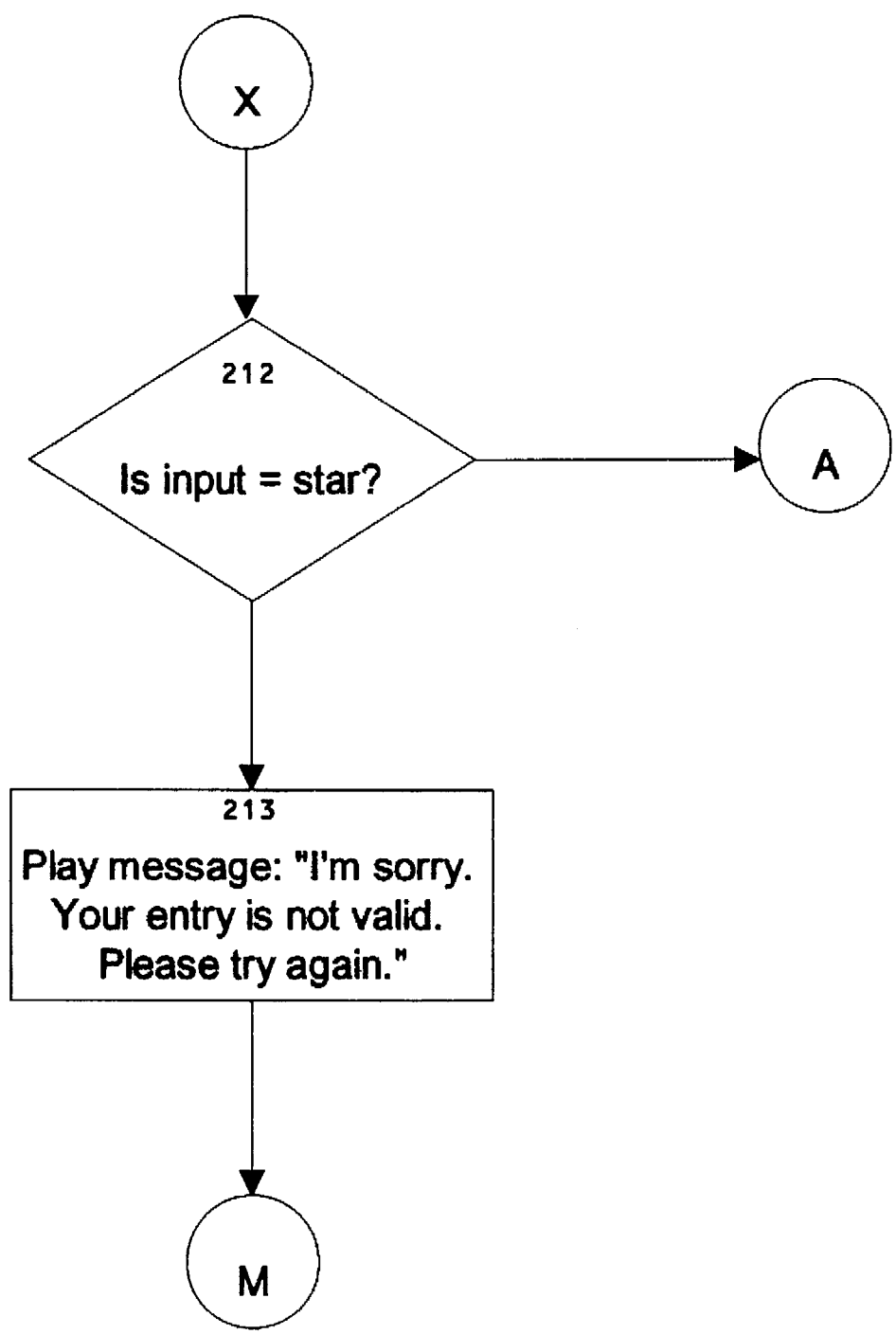
Figure 18:
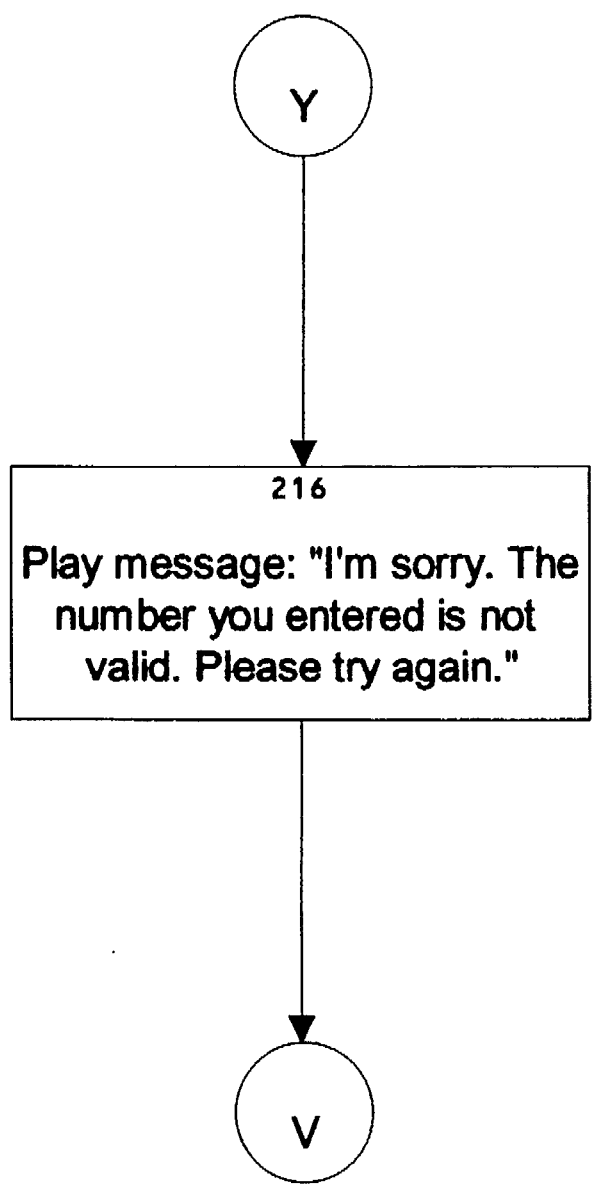

If it is determined at step 170 (FIG. 11) that the input at step 169="3", the CSIP 40 plays a message at step 191 (FIG. 15) that instructs the user to enter the number to be added and to press the pound key to complete the entry. It also says that the "star" key can be pressed to return to the main administrative menu. The CSIP 40 then collects digits, and if it is determined at step 142 that the input=the "star" key, the subscriber is routed to step 14 (FIG. 2). If the input consists of digits, the CSIP 40 checks to see if the entered digits match the template of a valid telephone number. If they do not, the CSIP 40 checks at step 196 to see if all retries have been exhausted, and if not, it plays a "try again" message at step 216 (FIG. 18) and then returns to step 191 (FIG. 15). If it is determined at step 196 that all retries have been exhausted, then the CSIP 40 plays the "try later" message at step 37 (FIG. 4) and terminates.

If it is determined at step 194 (FIG. 15) the digits entered at step 191 do match a valid telephone template, then at step 200 (FIG. 16) the CSIP 40 plays back the number entered and, the choice is given to press "1" if correct, or press "2" if not correct. The CSIP 40 collects the digit, and if it is determined at step 201 that the input="1", the CSIP 40 checks at step 202 to make sure the list is not full. If it is full, the CSIP 40 removes the oldest number from the list at step 203 and adds the new number at step 204. It then plays a message at step 205 indicating that the number has been added to the list, and returns to step 191 (FIG. 15) allow another number to be added or to exit if finished.

If it is determined at steps 201, 207 (FIG. 16) that the input at step 200="2", the CSIP 40 plays a "not added" message at step 208 and then returns to step 191 (FIG. 15) to allow another number to be added or to exit if finished. If it is determined at steps 201, 207 (FIG. 16) that the input at step 200 is other than "1" or "2", the CSIP 40 plays a message at step 210 advising the subscriber that there is an error and inviting him to try again, then returns to step 191 (FIG. 15).

Change Recordings

Figure 19:
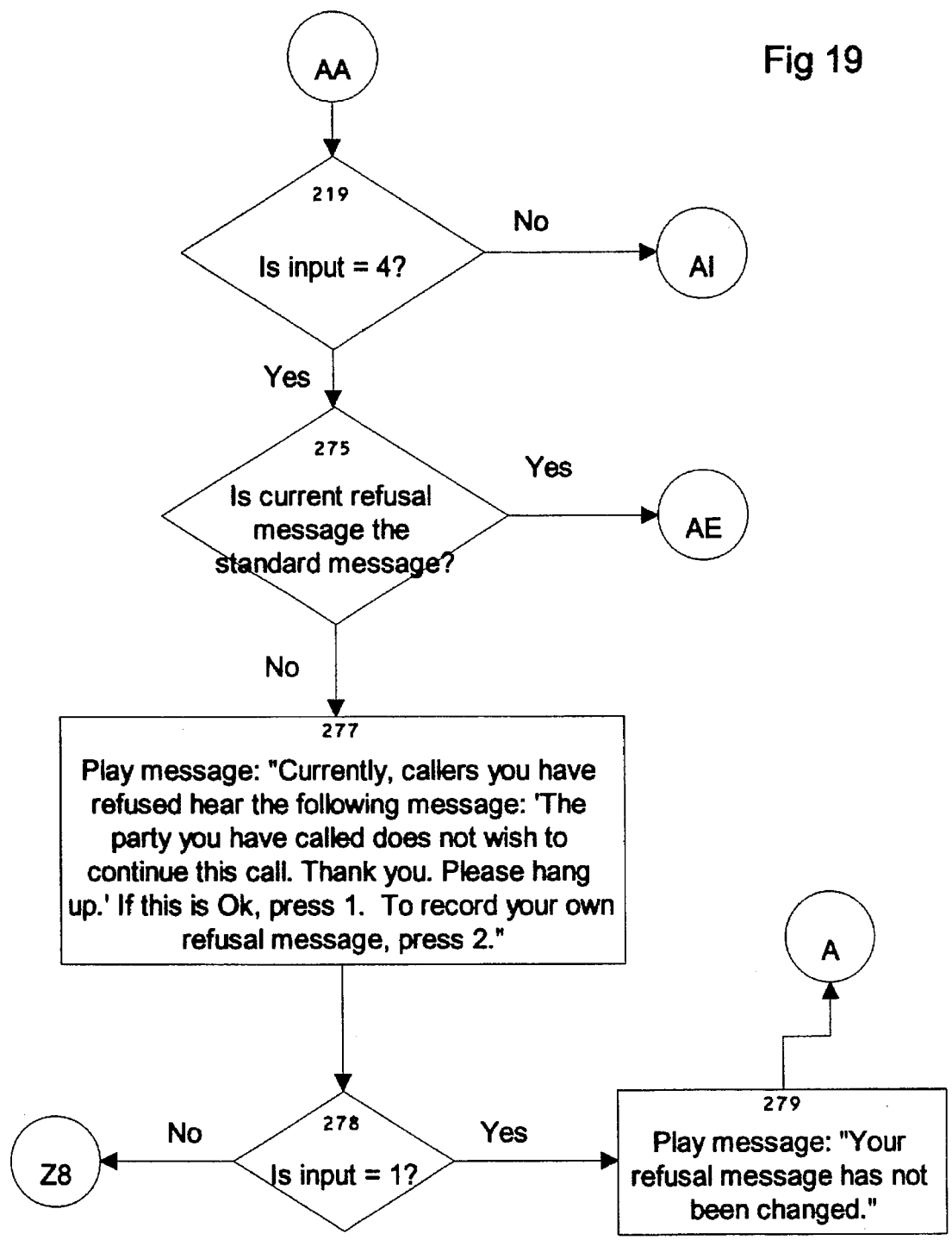
Figure 20:
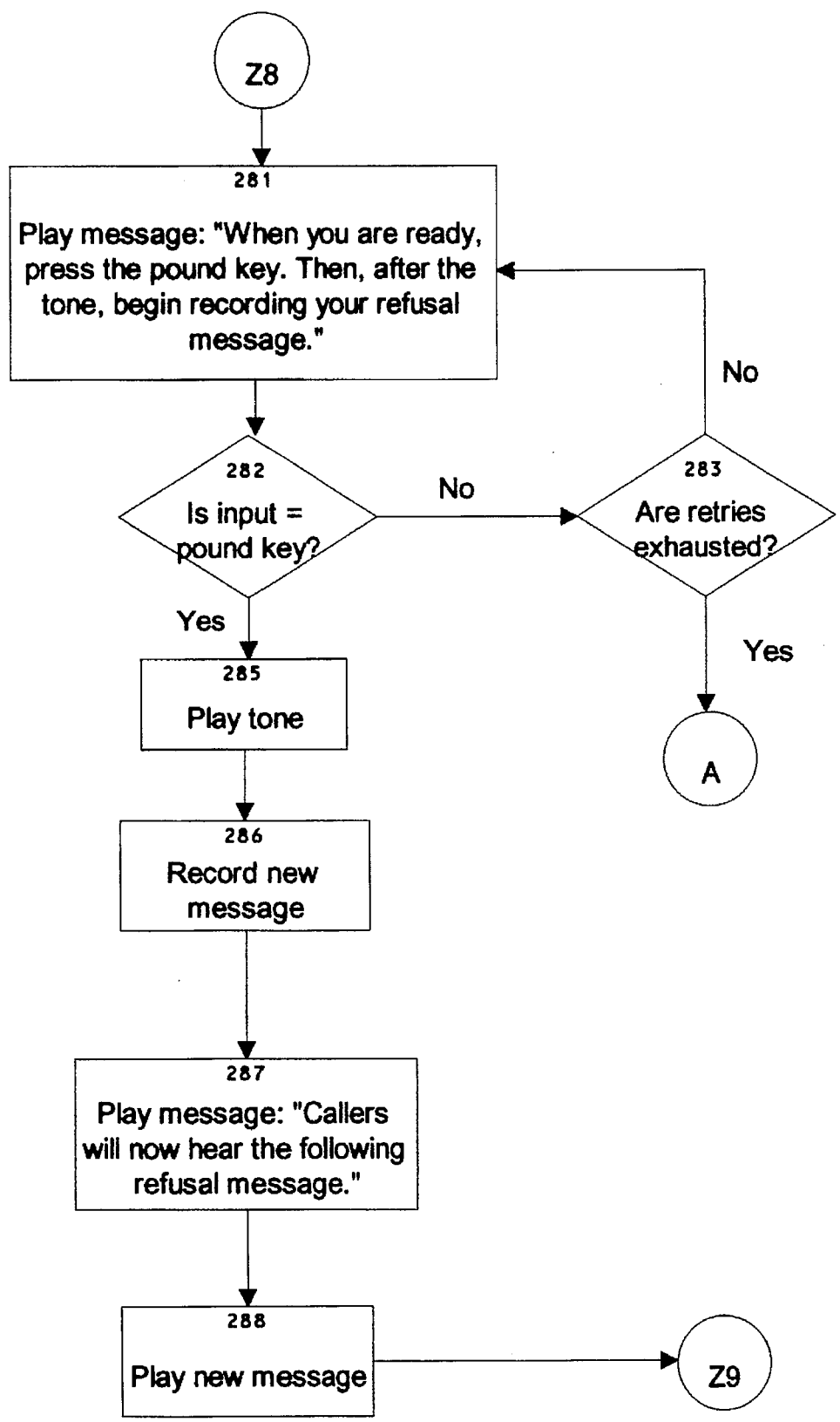
Figure 21:
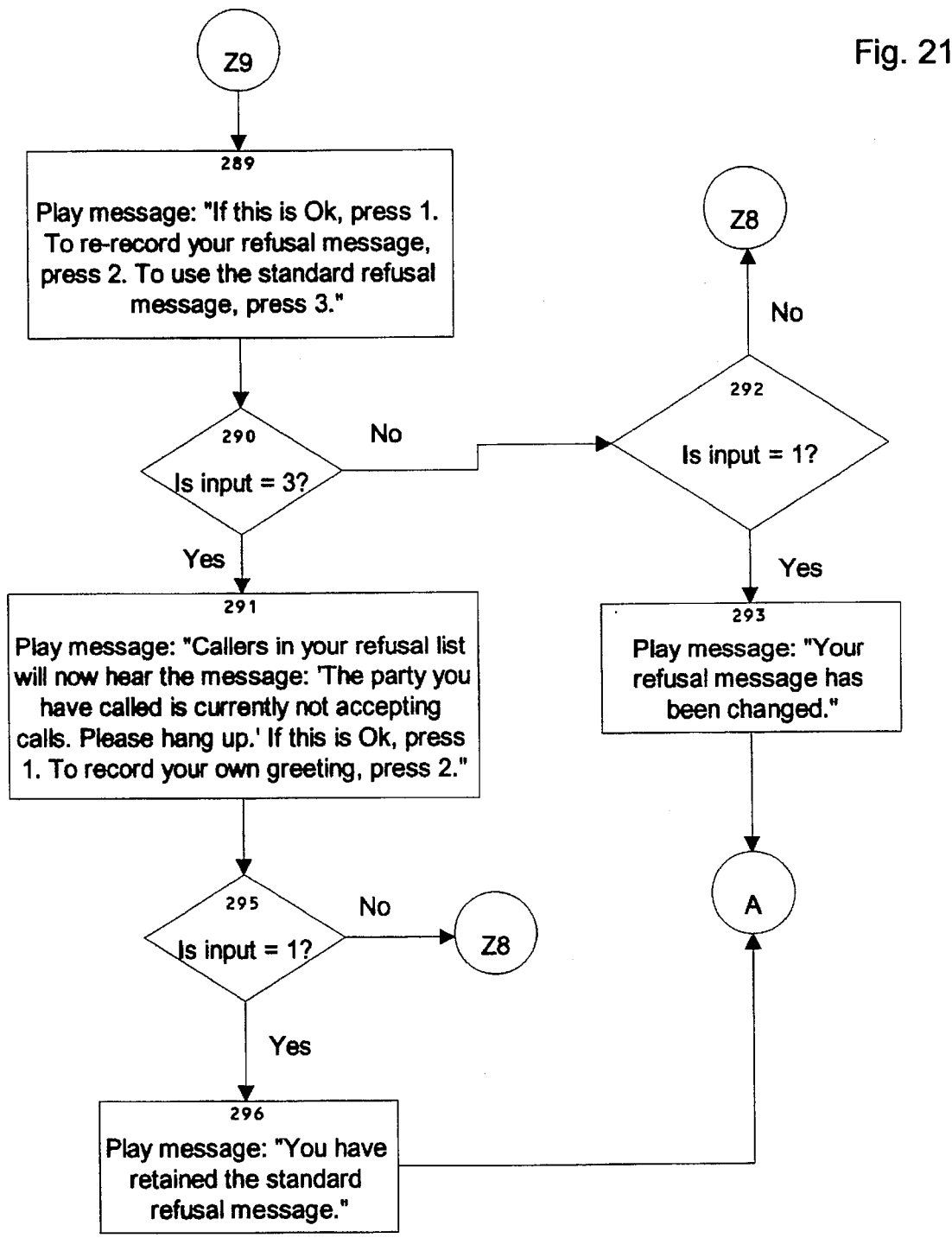
Figure 22:
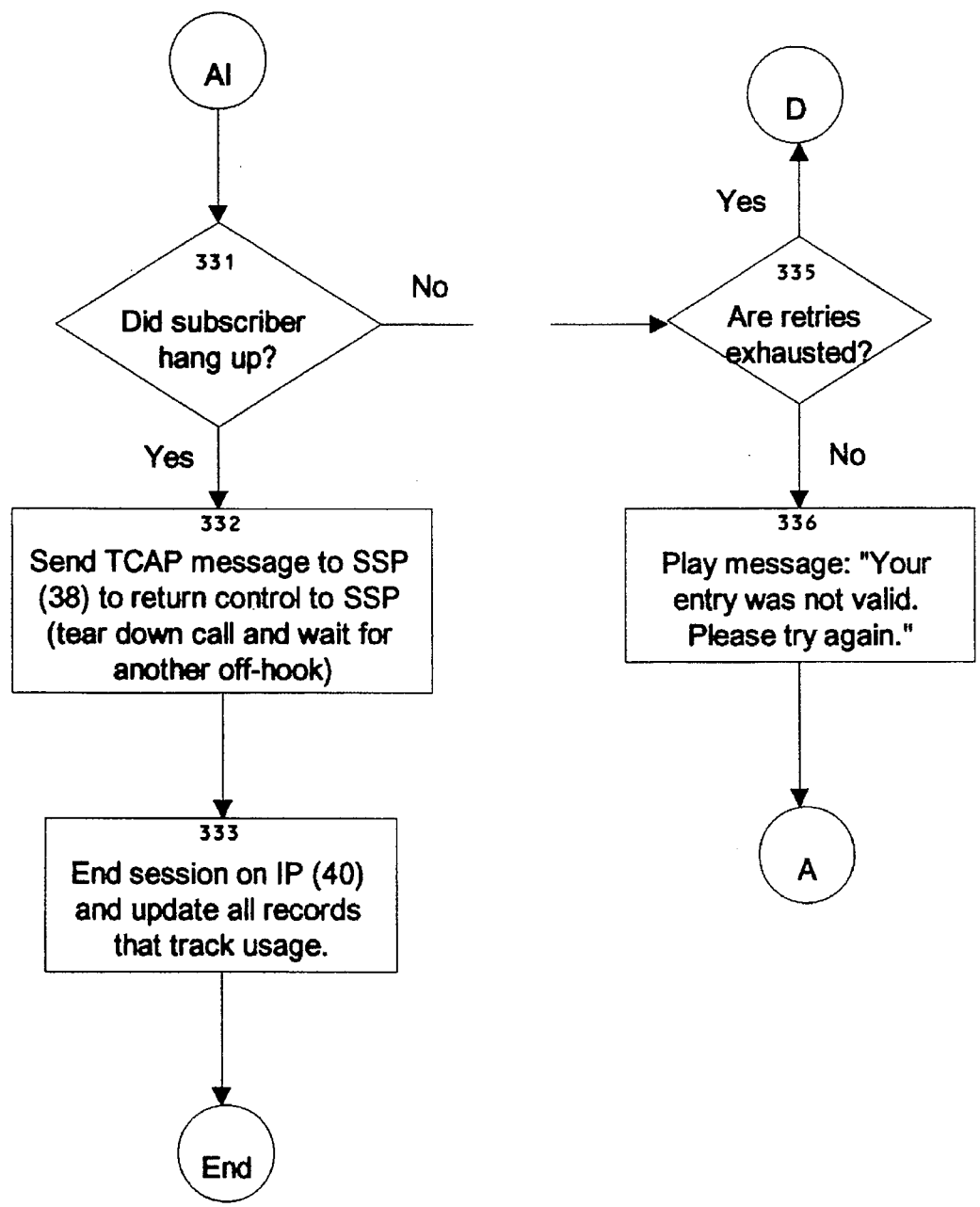
Figure 23:
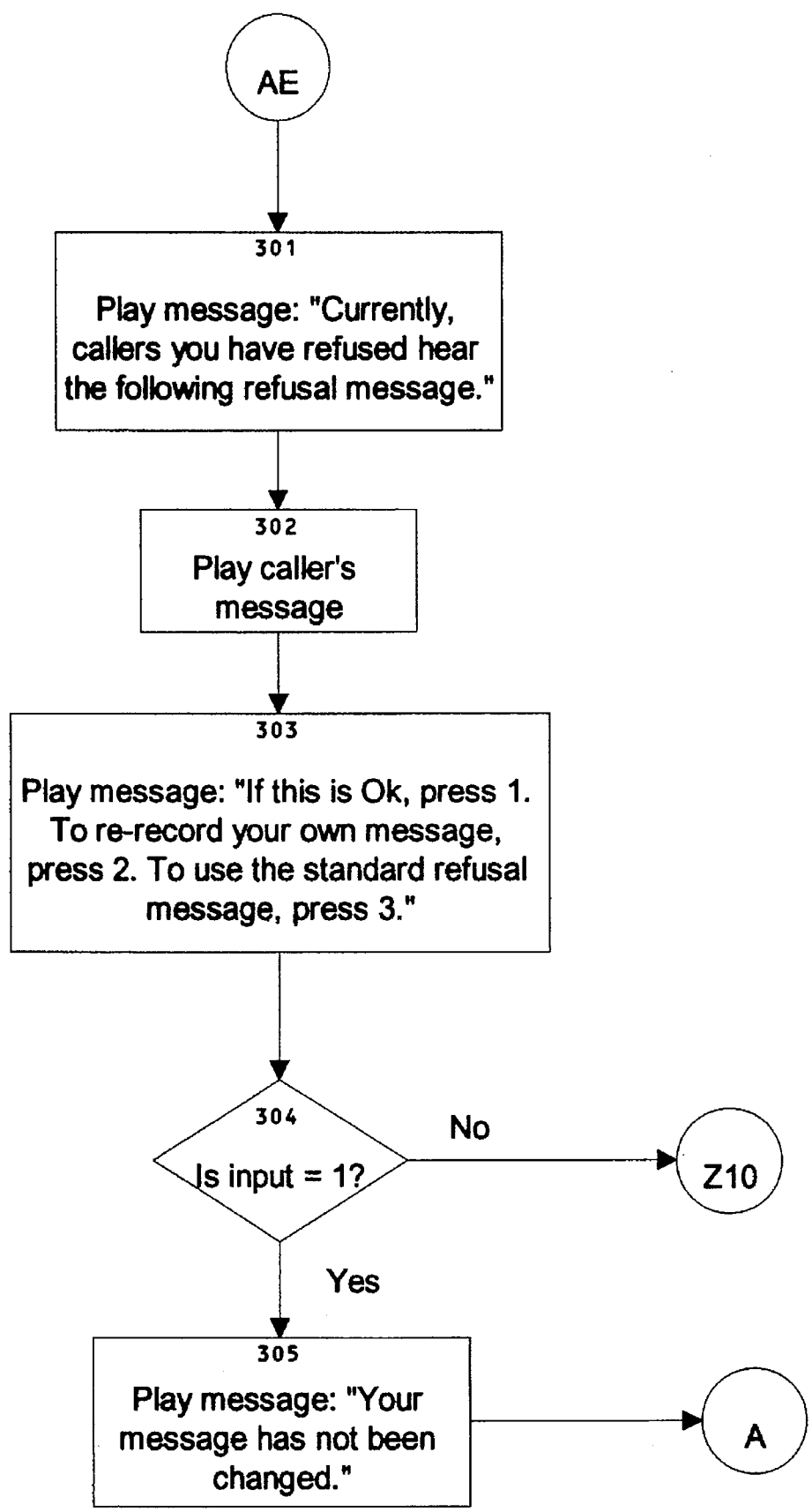
Figure 24:
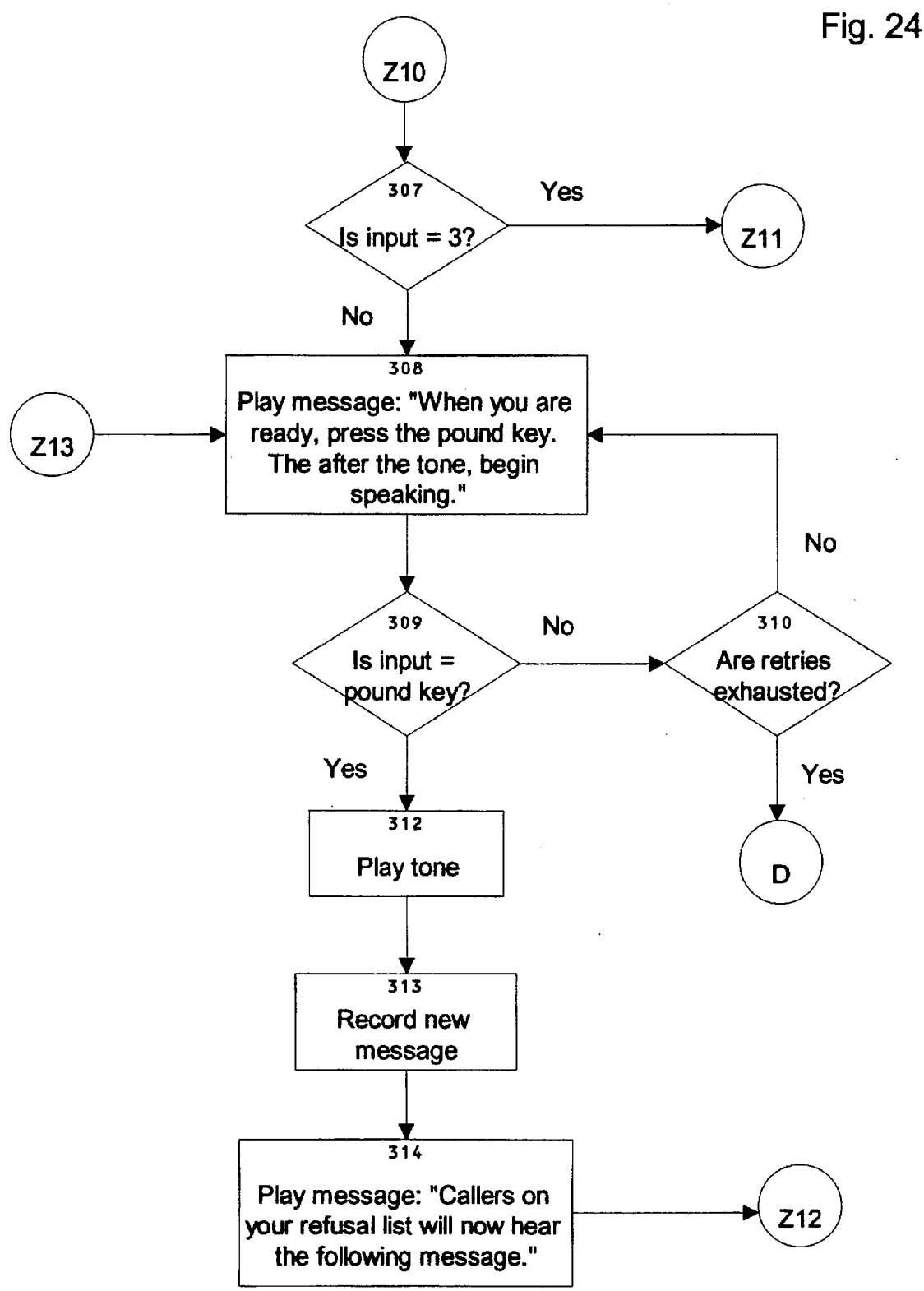
Figure 25:
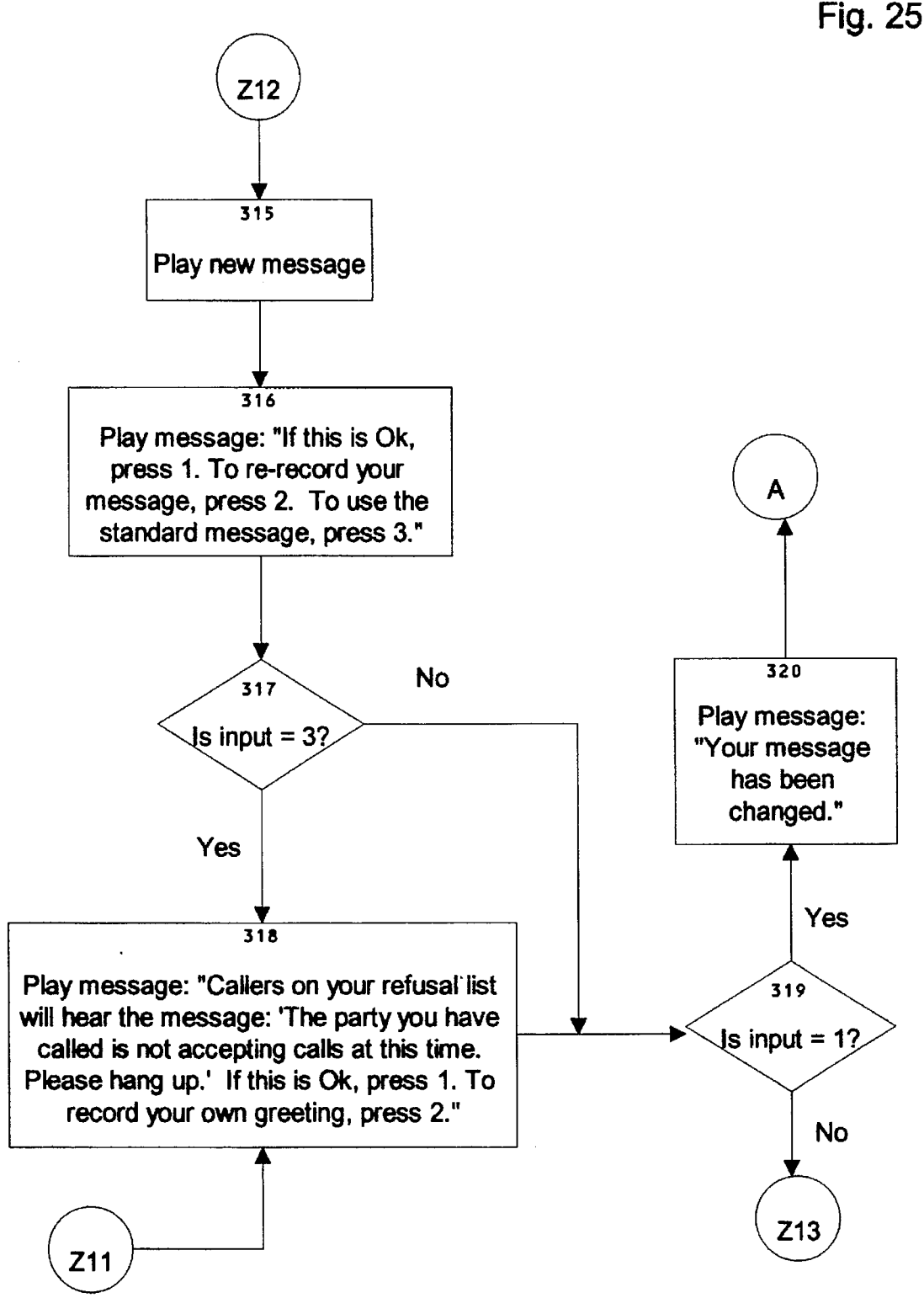

If it is determined at steps 28, 42, 49 that the digit collected at step 27 (FIG. 2) is "4", the CSIP 40 checks at step 275 (FIG. 19).

Change Refusal Message

The CSIP 40 checks at step 275 (FIG. 19) to see if the standard refusal message is currently being used. If the standard refusal message is currently being used, the CSIP 40 at step 277 plays the current standard refusal message that callers hear, and then instructs the subscriber to press "1" to keep this greeting, or to press "2" to record her own customized greeting.

If it is determined at step 278 that the input at step 277 is "1", the CSIP 40 plays a "no change" message at step 279 and then returns to step 14 (FIG. 2).

If it is determined at step 278 that the input at step 277 is "2", the CSIP 40 plays a message at step 281 (FIG. 20) that gives instructions on how to record the refusal message, including pressing the "pound" key, waiting for the beep, and beginning to speak. The CSIP 40 then collects the input, and if it is determined at step 282 that the input is the "pound" key, the CSIP 40 plays a tone at step 285 and records the new refusal message at step 286. The CSIP 40 detects when there is no acoustical energy from the subscriber's recording and ends the recording of the refusal message. It then introduces the new refusal message at step 287 and plays it at step 288. It then plays a message at step 289 instructing the subscriber to press "1" if the recording is okay, to press "2" to re-record the refusal message, or to press "3" to use the standard refusal message.

If it is determined at steps 290, 292 (FIG. 21) that the input at step 289 is "1", the CSIP 40 plays a message at step 293 telling the subscriber that the refusal message has been changed, and then goes to step 14 (FIG. 2).

If it is determined at steps 290, 292 that the input at step 289 is "2", the CSIP 40 plays the message at step 281 and continues as described above.

If it is determined at step 290 that the input at step 289 is "3", the CSIP 40 plays the standard refusal message at step 291 and then instructs to press "1" if this is okay, or press "2" to record a customized refusal message. If it is determined at step 295 that the input at step 291 is "1", the CSIP 40 plays a "no change" message at step 296 and then goes to step 14. If it is determined at step 295 that the input at step 291 is "2", the CSIP 40 plays the message at step 281 and continues as described above.

If it is determined at step 275 (FIG. 19) that a customized refusal message is currently being used, the CSIP 40 introduces at step 301 (FIG. 23) the current customized refusal message that callers hear and plays it at step 302. At step 303, it then instructs the subscriber to press "1" if the recording is okay, to press "2" to re-record the customized refusal message, or to press "3" to use the standard refusal message.

If it is determined at step 304 (FIG. 23) that the input at step 303 is "1", the CSIP 40 plays a message at step 305 telling the subscriber that the greeting has not been changed, and then goes to step 14 (FIG. 2).

If it is determined at steps 304, 307 that the input at step 303 is "2", the CSIP 40 plays a message at step 308 which gives instructions on how to record the greeting, including pressing the pound key, waiting for the beep, and beginning to speak. The CSIP 40 then collects the input, and if it is determined at step 309 that the input=the "pound" key, the CSIP 40 plays a tone at step 312 and records the new greeting at step 313. The CSIP 40 detects when there is no acoustical energy from the subscriber's recording and ends the recording of the greeting. It then introduces the new greeting at step 314 and plays it at step 315. It then plays a message at step 316 instructing the subscriber to press "1" if the recording is okay, to press "2" to re-record the greeting, or to press "3" to use the standard greeting.

If it is determined at steps 304, 307 (FIGS. 23 and 24) that the input at step 303 is "3", the CSIP 40 plays the standard refusal greeting at step 318 and then instructs the subscriber to press "1" if this is okay, or press "2" to record a customized refusal greeting. If it is determined at step 319 that the input at step 318 is "1", the CSIP 40 advises at step 320 that the greeting has been changed and then goes to step 14 (FIG. 2). If it is determined at step 319 that the input at step 318 is "2", the CSIP 40 plays the message at step 308 and continues as described above.

If it is determined at steps 317, 319 (FIG. 25) that the input at step 316 is "1", the CSIP 40 plays a message at step 320 telling the subscriber that the greeting has been changed, and then goes to step 14 (FIG. 2).

If it is determined at steps 317, 319 (FIG. 25) that the input at step 316 is "2", the CSIP 40 plays the message at step 308 and continues as described above.

If it is determined at step 317 that the input at step 316 is "3", the CSIP 40 plays the standard greeting at step 318 and then instructs the subscriber to press "1" if this is okay, or press "2" to record a customized greeting. If it is determined at step 319 that the input at step 318 is "1", the CSIP 40 plays the message at step 320 and then goes to step 14 (FIG. 2). If it is determined at step 319 that the input at step 318 is "2", the CSIP 40 plays one message at step 308 and continues as described above.

If it is determined at step 28 (FIG. 3) that the input at step 27 is not "1", "2", "3", "4", "5", "8", or "9", the CSIP 40 checks at step 331 (FIG. 22) to see if the subscriber has hung up. If the subscriber has hung up, at step 332 the CSIP 40 sends a TCAP message to the SSP 32 instructing it to return control to the SSP 32. This ends the session on the CSIP 40, and at step 333 the CSIP 40 updates all records that track usage.

If the subscriber does not hang up, the CSIP 40 checks at step 335 to see if all retries have been exhausted. If they have not been exhausted, the CSIP 40 plays a message at step 336 which advises the subscriber that the entry was not valid and invites the subscriber to try again. The program then jumps back to the Main Menu at step 14. If all entries have been exhausted, the CSIP 40 plays the error message at step 37 (FIG. 4), disconnects the subscriber at step 38 and at step 39 and tells the switch to send a fast-busy signal until the subscriber goes on-hook.

Background Functions

This section contains details of the operation of some of the functions that the CSIP 40 performs in addition to those described above. These activities are illustrated in FIGS. 26-30. This section includes activities such as activating a new subscriber, suspending or deactivating a subscriber, recording the occurrence of certain events, and the scheduling and timing of certain events. The events that can be recorded include reporting when a call was received; recording who placed the call (Caller ID); the duration of the call; what actions were performed during the call; what service configuration, if any, was changed during the call; and whether the subscriber chose to accept the call, take a message, or refuse the call. The scheduling function is concerned primarily with the Do Not Disturb function. When the subscriber decides to turn off the service for a specified period of time, the CSIP 40 times that period and automatically reinstates the service when the period has elapsed.

Figure 26:
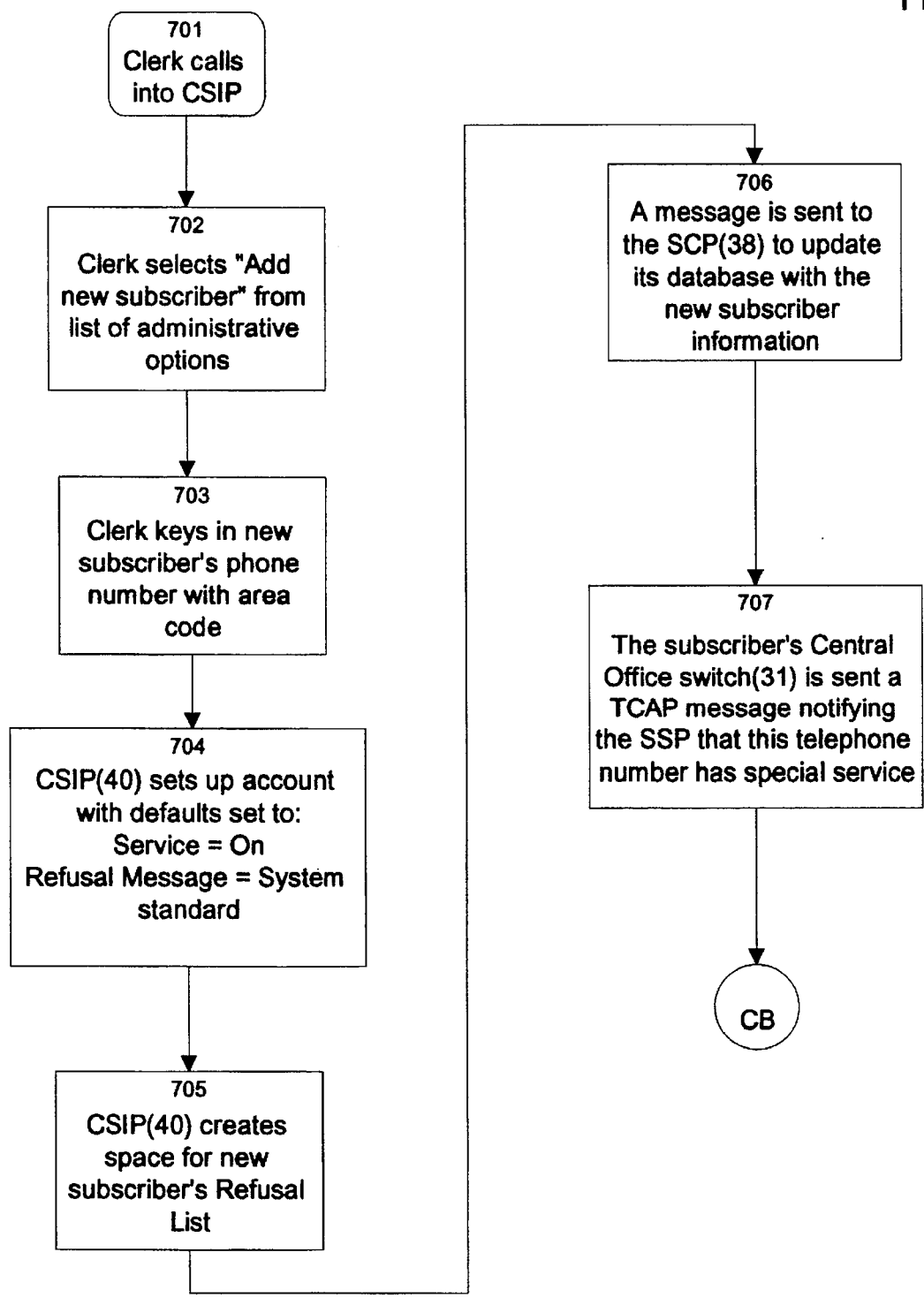
Figure 27:
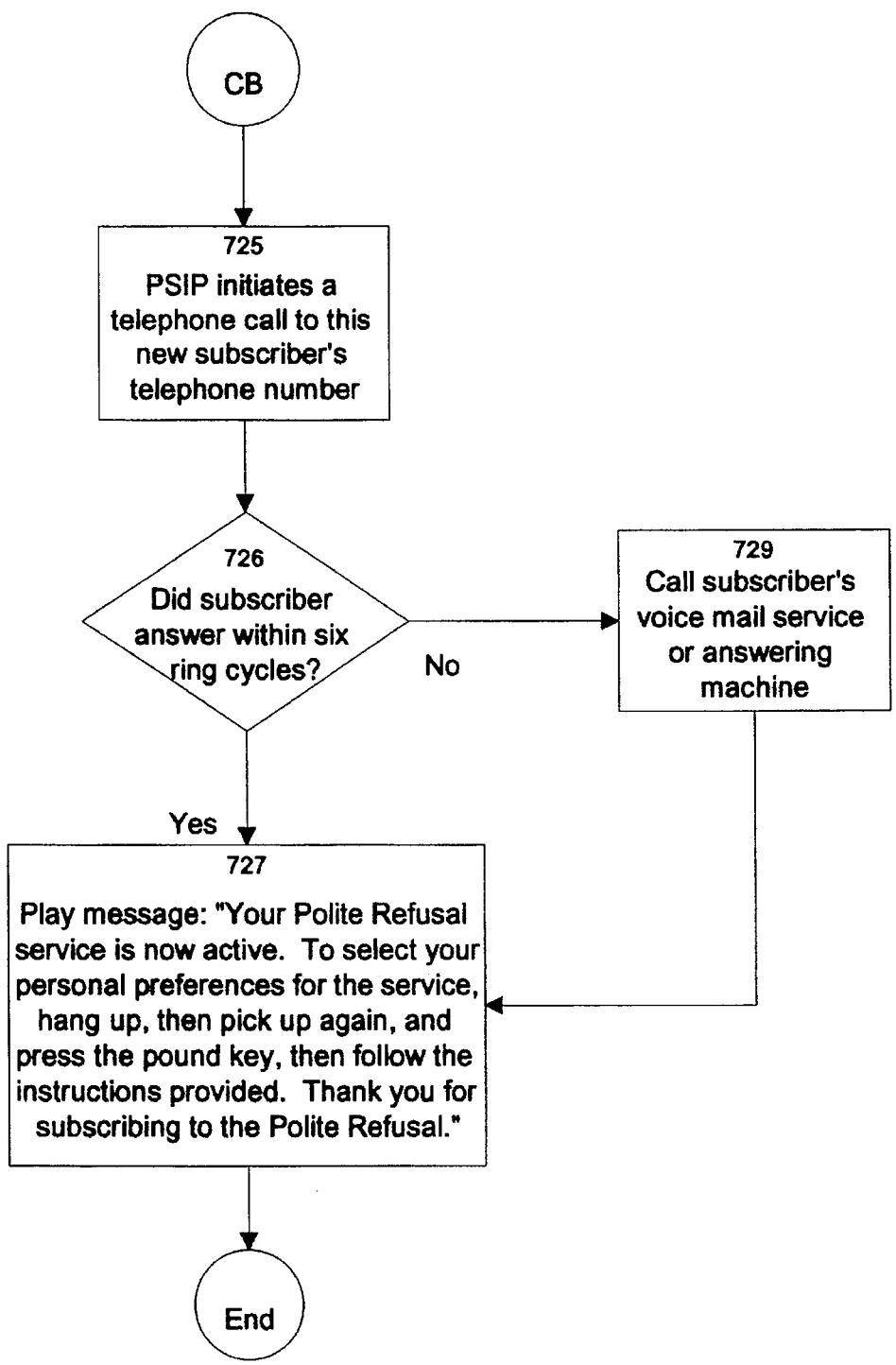

FIGS. 26 and 27 illustrate the activation of a new subscriber. At step 701, a clerk or customer service representative calls into the CSIP 40. At step 702, the clerk selects the function "Add new subscriber" from the list of administrative options. At step 703, she keys in the new subscriber's phone number, including the area code. At step 704, the CSIP 40 then sets up the account with the defaults set as follows: Call Screening Service=On; Do Not Disturb=Off; the introductory Greeting=standard message; the Refusal message=standard message. At step 705, the CSIP 40 then creates space on the disk for the new subscriber's Special Caller List and Refusal List.

At step 706, the CSIP 40 then sends a message to the SCP 38 (FIG. 1) to update its database with the new subscriber information. At step 707, the CSIP 40 sends a TCAP message via the subscriber's Central Office 31 notifying the SSP 32 that this telephone number has special services.

At step 725 (FIG. 27), the CSIP 40 then initiates a telephone call to the subscriber's telephone. At step 726, the CSIP 40 checks to see if the phone is answered within six rings, and if it is, at step 727 the CSIP 40 plays a message to the subscriber advising that the service is now activated and that the service can be personalized in certain ways. If the call if not answered within six rings, the CSIP 40 then calls the subscriber's answering machine or VMS at step 729 and leaves the same message as the one at step 727, and the CSIP 40 then disconnects the line at step 728.

Figure 28:
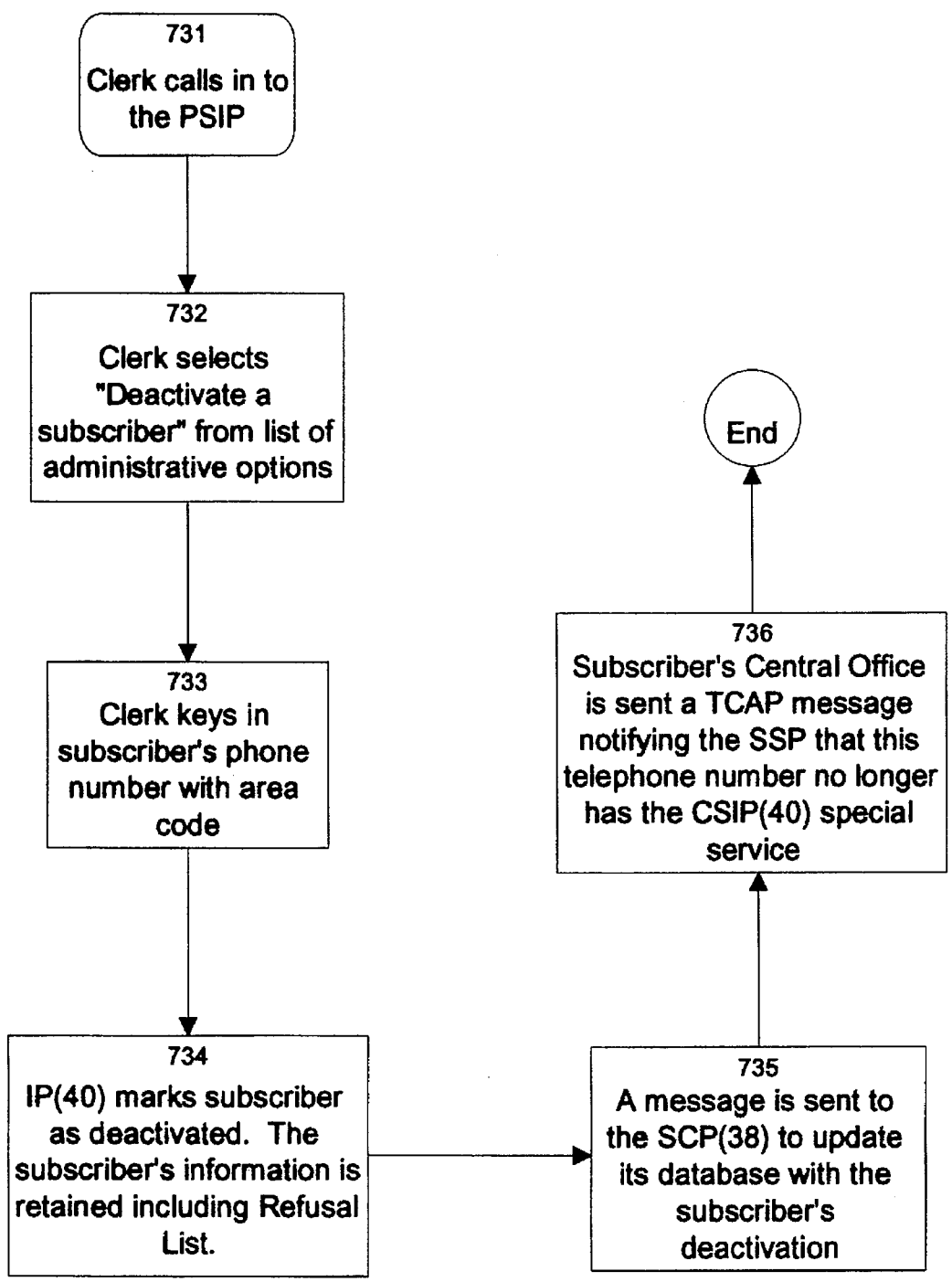

To deactivate or suspend the service, the clerk or customer service representative calls the CSIP 40 at step 731 (FIG. 28). At step 732, the clerk at step 732 selects a function "Deactivate a subscriber" from the list of administrative options. The clerk at step 733 enters the subscriber's phone number, with area code. The CSIP 40 then marks the subscriber's account as deactivated at step 734. The subscriber's information is retained, including Special Caller List and Refusal List. At step 735, the CSIP 40 then sends a message to the SCP 38 to update its database with the information of the subscriber's deactivation. At step 736, a TCAP message is then sent to the subscriber's Central Office 31 notifying the SSP 32 that this telephone number no longer has the CSIP 40 special service. The call is then disconnected at step 737.

Figure 29:
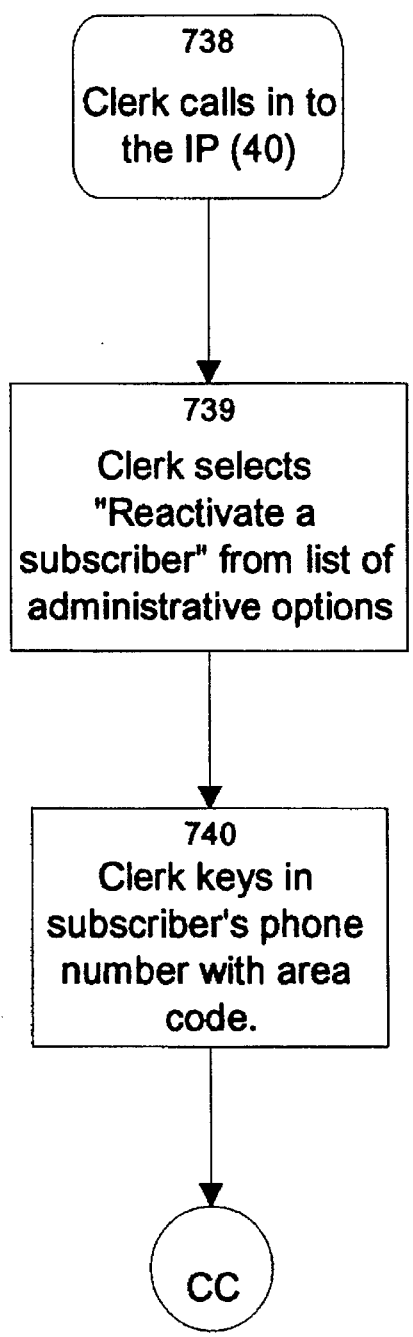
Figure 30:
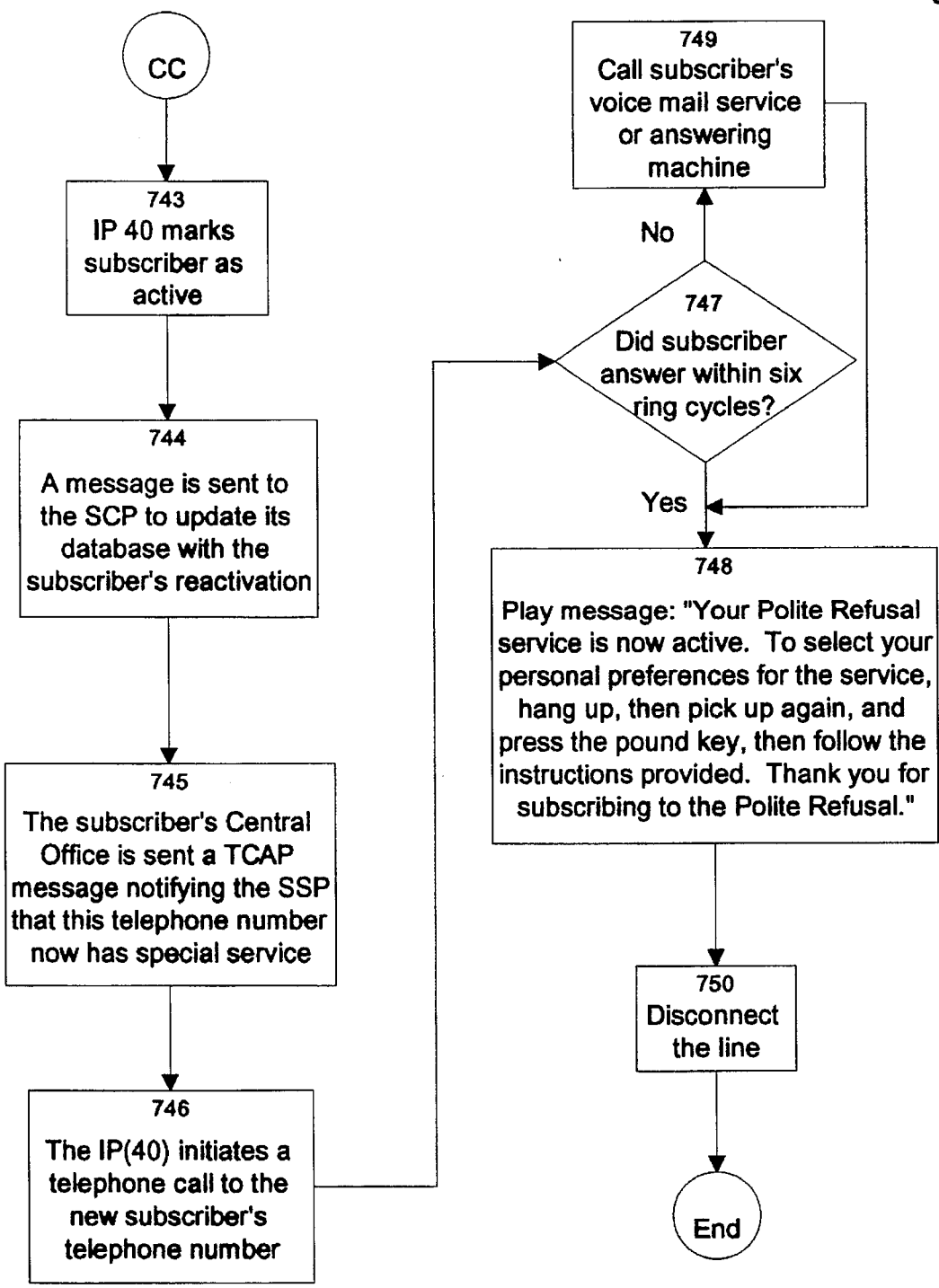
Figure 31:
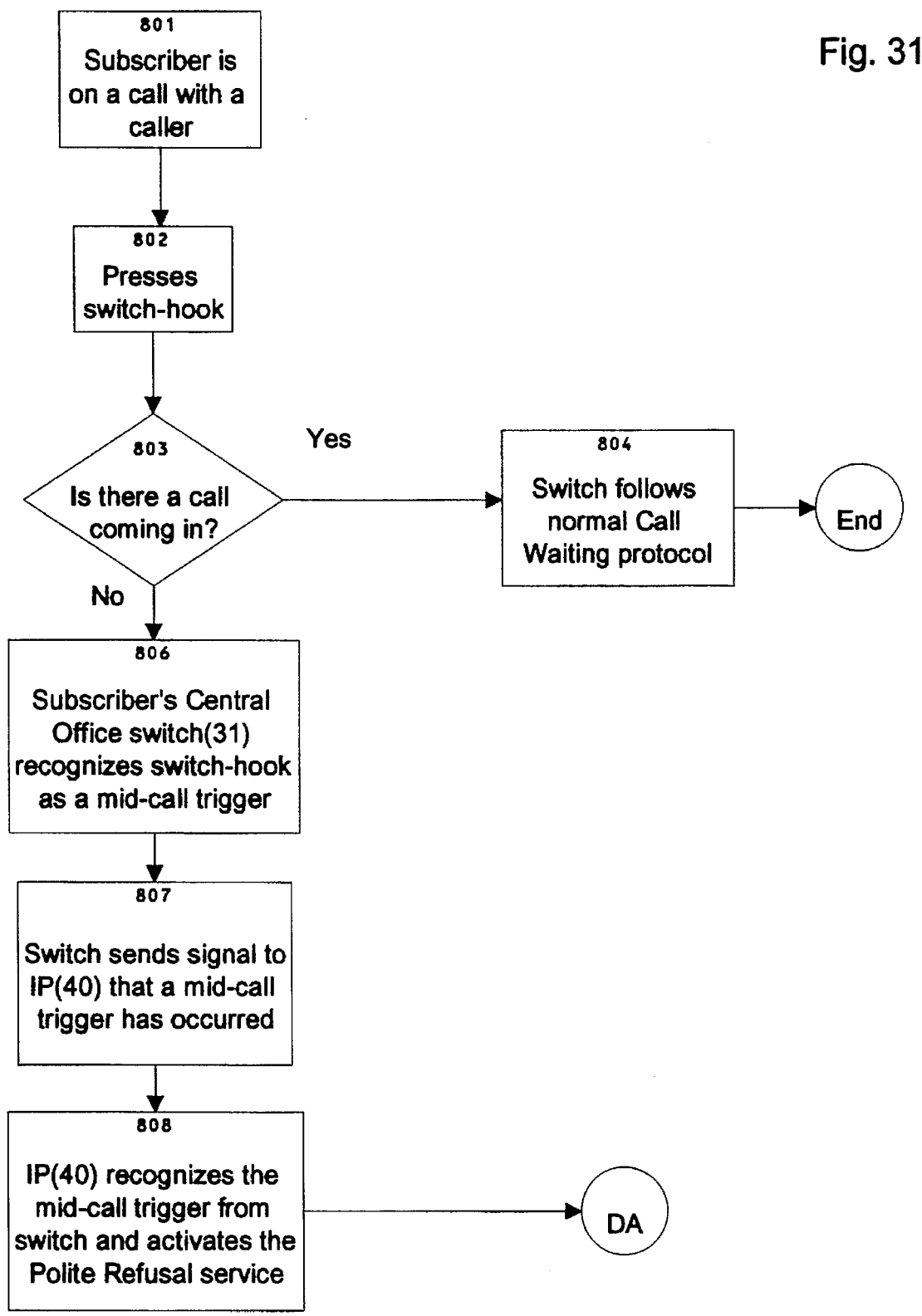
Figure 32:
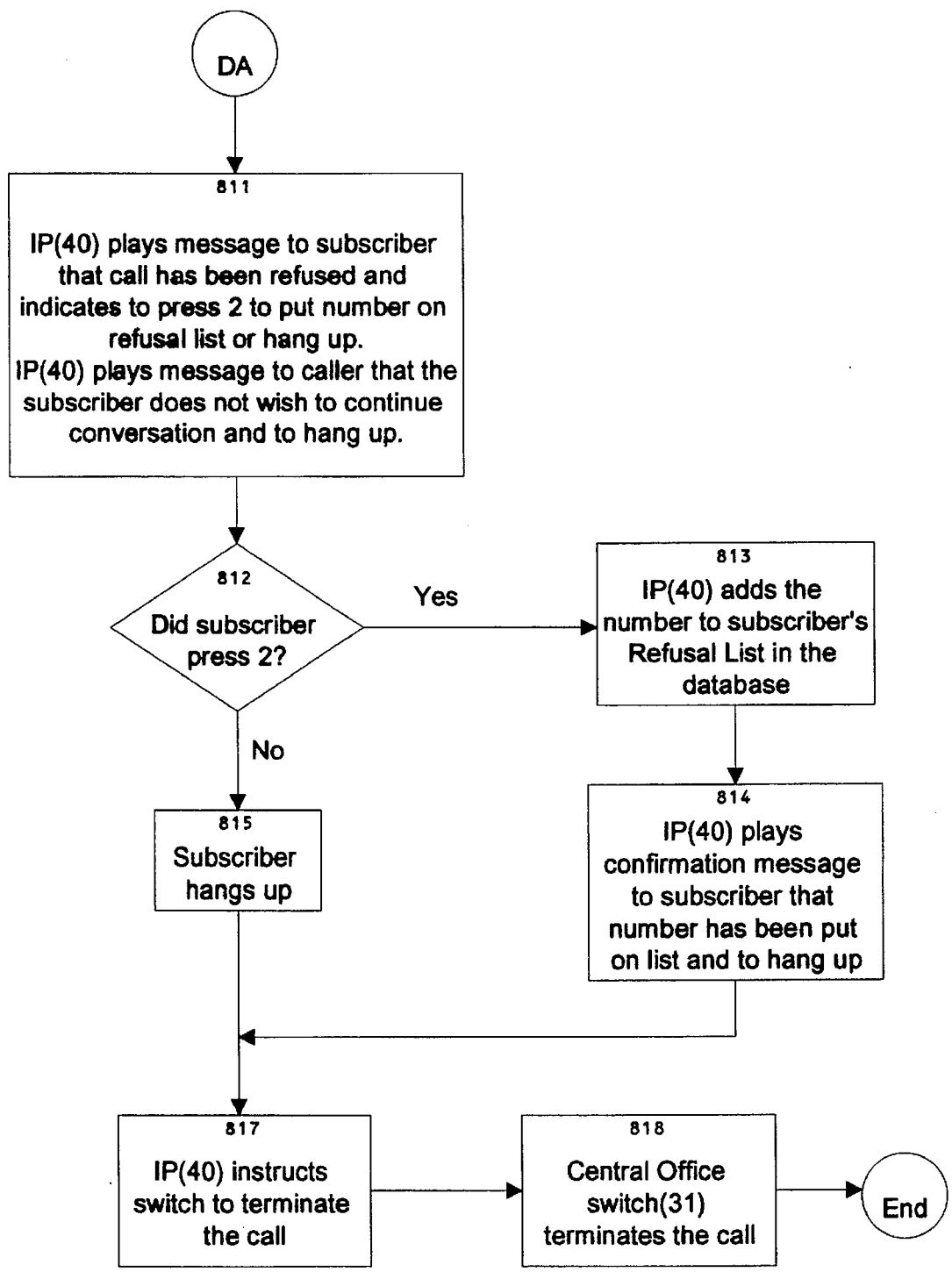

Subsequently, if the service is to be reactivated, the following procedures are followed. The clerk or customer service representative calls into the CSIP 40 at step 738 (FIG. 29). At step 739, the clerk selects the function "Reactivate a subscriber" from the list of administrative options. At step 740, the clerk then keys in the subscriber's phone number, including the area code. The CSIP 40 then marks the subscriber's account as active at step 743 (FIG. 30). At step 744, the CSIP 40 then sends a message to the SCP 38 to update its database with the new subscriber information. At step 745, the subscriber's Central Office 31 is then sent a TCAP message notifying the SSP 32 that this telephone number has special services.

The CSIP 40 then initiates a telephone call to the subscriber's telephone at step 746. The CSIP 40 checks at step 747 to see if the phone is answered within six rings, and if it is, the CSIP 40 plays a message to the subscriber at step 748 indicating that the service is now activated and that the service can be personalized in certain ways. If the call is not answered within six rings, the CSIP 40 calls the subscriber's answering machine or VMS at step 749 and leaves the same message on the answering device. The CSIP 40 then disconnects the line at step 750.

Additional Features and Capabilities

In addition to the basic Call Screening service, there are additional features that may be added to the Call Screening as options. These are described below.

Polite Refusal

With this feature, a subscriber who is on a call with some calling party can, by pressing the switch hook, politely get out of the call and not have to speak further with the calling party. When the subscriber presses the switch hook, the calling party is given a message indicating that the subscriber does not wish to continue the conversation and the caller is instructed to hang up. After pressing the switch hook, the subscriber receives a confirmation message that the Polite Refusal feature has been activated, and then, as with the refusal function with an incoming call, the subscriber is given the option of putting the phone number of this caller on the subscriber's Refusal List.

Assume that the subscriber is talking on the phone with a caller at step 801 (FIG. 31) and decides he does not wish to continue with the call. At step 802, he presses the switch hook provided on all phone sets (he may optionally press a TAP key or a flash key, which are provided on many phone handsets).

The subscriber's Central Office switch 31 checks at step 803 to see if currently there is an incoming call; if so, at step 804 the switch 31 follows the normal Call Waiting procedure.

If there is not an incoming call, at step 806 the subscriber's Central Office switch 31 recognizes the switch hook flash as a mid-call trigger. The Central Office switch 31 then sends a signal at step 807 to the CSIP 40 informing it that a mid-call switch hook flash has occurred, which the CSIP 40 recognizes as an instruction to activate the Polite Refusal feature. The CSIP 40 then activates the Polite Refusal feature at step 808.

At step 811 (FIG. 32), the CSIP 40 then plays a message to the subscriber indicating that Polite Refusal has been activated and that the call has been refused. It also advises the subscriber to press "2" if he wishes to put the number of this calling party on the Refusal List. Concurrently with these actions, the CSIP 40 plays a message to the caller indicating that the subscriber does not wish to continue the conversation and that the caller should hang up. The CSIP 40 determines at step 812 if "2" is pressed. If it is pressed, the CSIP 40 adds the number to the subscriber's refusal list at step 813 and at step 814 plays a confirmation message indicating to the subscriber that the call has been refused and that he should hang up. As indicated at step 815, the subscriber may just hang up without pressing "2" or any other number.

Once the messages have been delivered, the CSIP 40 instructs the subscriber's Central Office switch 31 to terminate the call at step 817. The switch 31 then disconnects the calling party at step 818.

Refusal List—As an option, the calling party's phone number is automatically put onto a Refusal List. This list has a capacity of approximately 20 to 50 phone numbers. When the list is full, the numbers are dropped off on a FIFO basis. (The subscriber can be given the option of determining whether or not to put a number on the list.)

I claim:

1. A method of providing a service assisting a subscriber to the service to screen incoming calls, the method comprising the steps of:

ringing the subscriber in response to an incoming call from a calling station;

while maintaining the subscriber answering the call disconnected from a caller who has placed the incoming call, identifying the caller to the subscriber;

while still maintaining the subscriber disconnected from the caller, giving the subscriber the option to accept the call, refuse the call, or enable the caller to leave a recorded message for later access by the subscriber; and in response to a mid-call trigger during an accepted call, disconnecting the subscriber from the caller, advising the caller that the subscriber does not wish to continue the conversation, and giving the subscriber the option of automatically blocking further calls from the same calling station.

* * * * *